US010610782B2

(12) United States Patent
Motokura et al.

(10) Patent No.: US 10,610,782 B2
(45) Date of Patent: Apr. 7, 2020

(54) GAME SYSTEM, NON-TRANSITORY STORAGE MEDIUM HAVING GAME PROGRAM STORED THEREIN, GAME APPARATUS, AND GAME PROCESSING METHOD

(71) Applicant: NINTENDO CO., LTD., Kyoto (JP)

(72) Inventors: Kenta Motokura, Kyoto (JP); Yusuke Kitazono, Kyoto (JP); Youtarou Kiriyama, Kyoto (JP); Wataru Tanaka, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 28 days.

(21) Appl. No.: 15/977,157

(22) Filed: May 11, 2018

(65) Prior Publication Data

US 2019/0060755 A1 Feb. 28, 2019

(30) Foreign Application Priority Data

Aug. 28, 2017 (JP) .................. 2017-163077

(51) Int. Cl.
*A63F 13/525* (2014.01)
*A63F 13/92* (2014.01)
(Continued)

(52) U.S. Cl.
CPC ............ *A63F 13/525* (2014.09); *A63F 13/49* (2014.09); *A63F 13/5255* (2014.09);
(Continued)

(58) Field of Classification Search
CPC .... A63F 13/525; A63F 13/49; A63F 13/5255; A63F 13/537; A63F 13/63; A63F 13/92; A63F 13/26; A63F 2300/203
(Continued)

(56) References Cited

U.S. PATENT DOCUMENTS 8,708,818 B2 * 4/2014 Sakaguchi .......... A63F 13/5255
463/31
2003/0100364 A1 * 5/2003 Mori ...................... A63F 13/10
463/30

(Continued)

FOREIGN PATENT DOCUMENTS

EP 2 497 550 A2 9/2012
EP 2 942 950 A1 11/2015
(Continued)

OTHER PUBLICATIONS

Extended European Search Report dated Nov. 6, 2018 issued in European Application No. 18177644.4 (11 pgs.).

(Continued)

*Primary Examiner* — Allen Chan
(74) *Attorney, Agent, or Firm* — Nixon & Vanderhye PC

(57) ABSTRACT

In an example of a game system, switching to an imaging mode is performed according to an operation performed by a player while a game is being performed. In the imaging mode, a virtual camera in a virtual space is rotated in a roll direction according to an operation performed by the player. In the game system, when rotation of the virtual camera in the roll direction represents a value greater than or equal to a predetermined threshold value, information indicating that 90 degrees rotation is to be performed is stored as rotation information of an image. In the game system, according to an instruction from the player, an image displayed on a screen at a time of the instruction, and the rotation information of the image are stored in a storage medium.

20 Claims, 17 Drawing Sheets

(51) Int. Cl.
- *A63F 13/63* (2014.01)
- *A63F 13/5255* (2014.01)
- *A63F 13/537* (2014.01)
- *A63F 13/49* (2014.01)
- *A63F 13/26* (2014.01)

(52) U.S. Cl.
CPC ............ *A63F 13/537* (2014.09); *A63F 13/63* (2014.09); *A63F 13/92* (2014.09); *A63F 13/26* (2014.09); *A63F 2300/203* (2013.01)

(58) Field of Classification Search
USPC .......................................................... 463/31
See application file for complete search history.

(56) References Cited

U.S. PATENT DOCUMENTS

| | | |
|---|---|---|
| 2008/0158242 A1 | 7/2008 | St. Jacques |
| 2009/0017907 A1* | 1/2009 | Shimizu .................. A63F 13/10 463/31 |
| 2010/0146253 A1 | 6/2010 | Kawamoto et al. |
| 2011/0306411 A1* | 12/2011 | Yamada .............. A63F 13/5258 463/31 |
| 2012/0309523 A1* | 12/2012 | Yamashita .............. A63F 13/42 463/31 |
| 2016/0361641 A1 | 12/2016 | Koizumi et al. |

FOREIGN PATENT DOCUMENTS

| | | |
|---|---|---|
| JP | 2005-204033 | 7/2005 |
| JP | 2008-067875 | 3/2008 |
| JP | 2016-106715 | 6/2016 |
| JP | 2017-4523 | 1/2017 |

OTHER PUBLICATIONS

Office Action dated Oct. 9, 2019 issued in European Patent Application No. 18 177 644.4 (5 pgs.).

NVIDIA released an Ansel driver which is available in "Mirror's Edge Catalyst", PC Watch, Jul. 15, 2016, [online], searched on Jul. 18, 2019, URL, http://pc.watch.impress.co.jp/docs/topic/review/1010324.html (5 pages).

Notice of Reasons for Refusal dated Jul. 25, 2019 in Japanese Patent Application No. 2017-163077 (4 pages) with English machine translation (5 pages).

* cited by examiner

F I G. 1
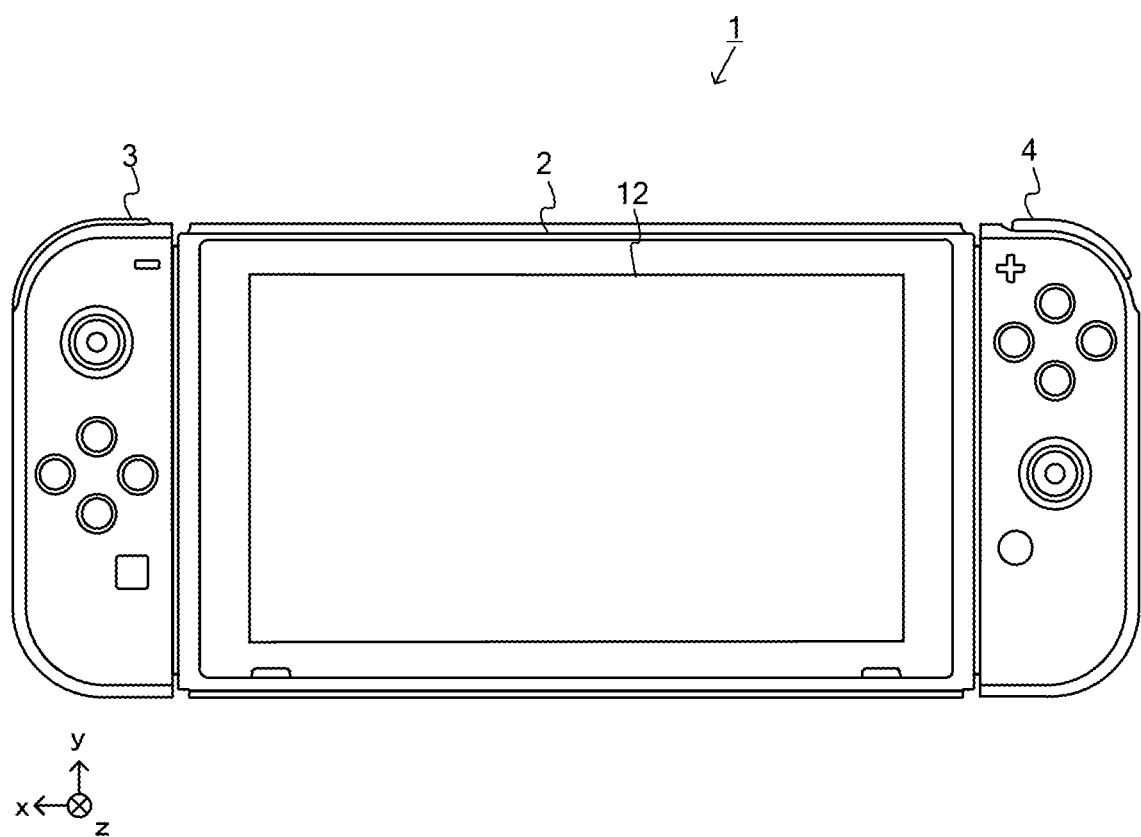

F I G. 1 3
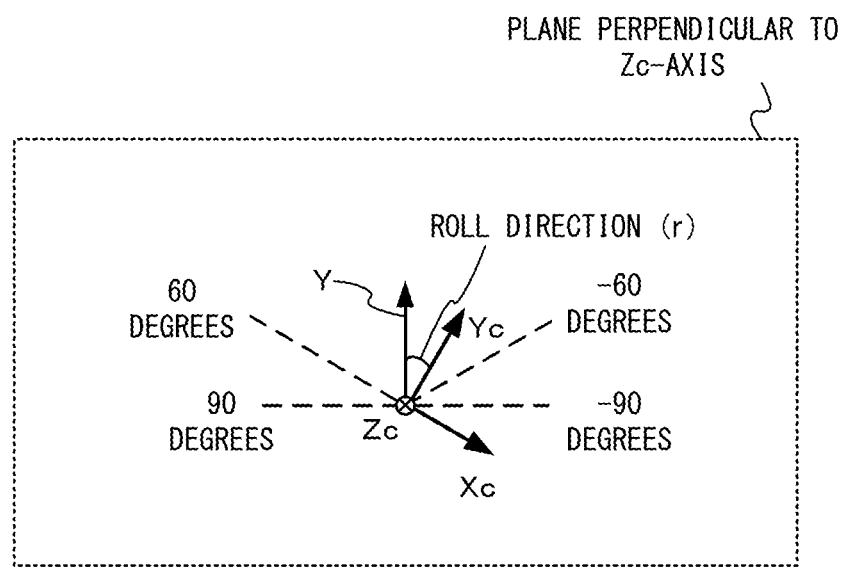

SCREEN IN IMAGING MODE (90 DEGREES)

SCREEN IN IMAGING MODE (HELD SO AS TO BE ORIENTED IN LONGITUDINAL DIRECTION)

GAME SYSTEM, NON-TRANSITORY STORAGE MEDIUM HAVING GAME PROGRAM STORED THEREIN, GAME APPARATUS, AND GAME PROCESSING METHOD

CROSS REFERENCE TO RELATED APPLICATION

The disclosures of Japanese Patent Application No. 2017-163077, filed on Aug. 28, 2017, are incorporated herein by reference.

FIELD

The technology herein relates to a game system for generating an image, a non-transitory storage medium having stored therein a game program for generating an image, a game apparatus for generating an image, and a game processing method for generating an image.

BACKGROUND AND SUMMARY

To date, an apparatus capable of executing a game and storing, in a storage medium, a game image to be displayed on a screen according to an instruction from a player, has been known.

However, in the aforementioned conventional art, an image to be displayed on a screen is merely stored as, for example, a laterally elongated image in a storage medium. There is room for improvement in displaying, when the stored image is displayed on another apparatus, the image in an appropriate orientation.

Therefore, an object of the exemplary embodiment is to provide a game system, a game program, a game apparatus, and a game processing method for storing an image which is able to be displayed in an appropriate orientation when the image is displayed on another apparatus.

In order to solve the aforementioned problem, the exemplary embodiment has the following configuration.

An exemplary embodiment provides a game system that includes an object control portion, a virtual camera control portion, an image generation portion, and an image storage processing portion. The object control portion is configured to control an object in a virtual space. The virtual camera control portion is configured to control an orientation of a virtual camera in the virtual space, based on an operation performed by a player. The image generation portion is configured to generate an image of the virtual space based on the virtual camera, for display, at certain time intervals. The image storage processing portion is configured to store, according to an instruction from a player, an image generated by the image generation portion at a time of the instruction, and rotation information, of the image, determined based on an orientation of the virtual camera at the time of the instruction, in a storage medium.

In the above-described configuration, an orientation of the virtual camera is controlled, and an image of the virtual space based on the virtual camera of which the orientation has been changed, and the rotation information, of the image, determined based on the orientation of the virtual camera are able to be stored in a storage medium. An image is rotated and rotation information according to the rotation is able to be stored in the storage medium. Therefore, for example, in a case where the image stored in the storage medium is displayed on another device, the image is able to be rotated and displayed.

In another configuration, the game system may further include a mode switching portion configured to perform switching to an imaging mode, during a game play, based on an operation performed by a player. In the imaging mode, the object control portion may control an object in the virtual space so as not to update a state of the object, and the virtual camera control portion may rotate the virtual camera at least around an axis of a line-of-sight direction, based on an operation performed by a player. The game system may further include a rotation information determination portion configured to determine the rotation information, based on an amount of rotation of the virtual camera around the axis of the line-of-sight direction at the time of the instruction.

In the above-described configuration, switching to the imaging mode is able to be performed during game play. In the imaging mode, a state of the object in the virtual space is not updated, whereby the object in the virtual space is able to be stationary. Furthermore, the virtual camera is able to be rotated around the axis of the line-of-sight direction, and the image having been rotated, and the rotation information are able to be stored in a storage medium.

In another configuration, in a case where the amount of rotation becomes greater than or equal to a threshold value, the rotation information determination portion may determine, as the rotation information, information indicating that an image stored in the storage medium is rotated by 90 degrees and displayed when the image is displayed.

In the above-described configuration, in a case where an amount of rotation around the axis of the line-of-sight direction becomes greater than or equal to a predetermined threshold value, information indicating that the image is rotated by 90 degrees and displayed is able to be stored in the storage medium. Thus, in a case where the image is displayed on another device, the image is able to be rotated by 90 degrees and displayed.

In another configuration, the game system may further include an additional image processing portion configured to add an additional image to at least a part of an image generated by the image generation portion, and rotate and add the additional image when an amount of rotation of the virtual camera becomes greater than or equal to a threshold value, in the imaging mode.

In the above-described configuration, an additional image is able to be added to an image of the virtual space, and the additional image is able to be similarly rotated.

In another configuration, the game system may further include a change processing portion configured to perform a process for changing a display manner for at least a part of an image generated by the image generation portion, according to an instruction from a player, in the imaging mode.

In the above-described configuration, a display manner for an image of the virtual space is able to be changed and stored in the storage medium.

In another configuration, the change processing portion may subject at least a part of an image generated by the image generation portion to at least one of a process of deforming the image, a process of blurring the image, a process of changing a color tone of the image, a process of changing a brightness of the image, a process of changing a resolution of the image, and a process of extracting a feature of the image.

In the above-described configuration, a display manner for an image is able to be changed by various processes being performed on the image of the virtual space.

In another configuration, the image generation portion may generate an image so as not to display a portion, of the image, which is displayed during the game play, in the imaging mode.

In the above-described configuration, an image displayed during game play is able to be stored in the storage medium such that the image is not displayed in the imaging mode.

In another configuration, the game system may further include: a display portion having a laterally elongated or a longitudinally elongated screen; a hand-held housing configured to support the display portion; and a display control portion configured to display, on the display portion, an image generated by the image generation portion.

In the above-described configuration, in the hand-held game system that is integrated with the display portion having a laterally elongated or longitudinally elongated screen, the image and the rotation information of the image are able to be stored in the storage medium.

In another configuration, an external output portion configured to output, to an outside, an image generated by the image generation portion, may be further provided.

In the above-described configuration, an image generated in the game system is able to be output to the outside, and the image is able to be displayed on an external device.

Another exemplary embodiment may provide a game program that executes processes performed by the components of the game system. Another exemplary embodiment may provide a game apparatus that includes the components of the game system. Another exemplary embodiment may provide a game processing method performed by an information processing system.

According to the exemplary embodiment, an image of the virtual space and the rotation information of the image are able to be stored in a storage medium.

These and other objects, features, aspects and advantages of the exemplary embodiment will become more apparent from the following detailed description when taken in conjunction with the accompanying drawings.

BRIEF DESCRIPTION OF THE DRAWINGS

FIG. 1 is an example non-limiting diagram showing an example of a state where a left controller 3 and a right controller 4 are attached to a main body apparatus 2;

FIG. 13 is an example non-limiting diagram showing an example of a criterion for determining rotation information of an image;

DETAILED DESCRIPTION OF NON-LIMITING EXAMPLE EMBODIMENTS

Figure 2:
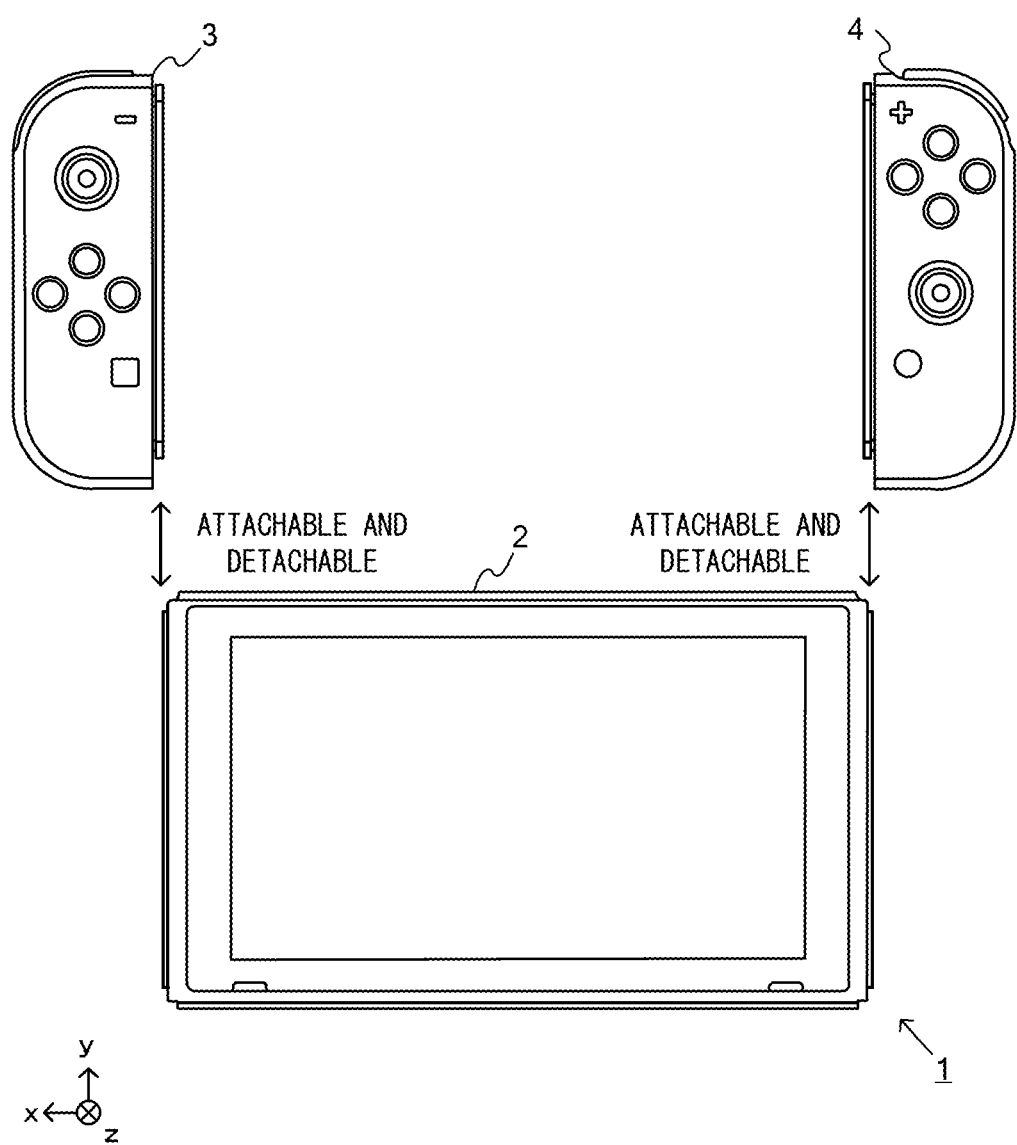
FIG. 2 is an example non-limiting diagram showing an example of a state where each of the left controller 3 and the right controller 4 is detached from the main body apparatus 2.

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
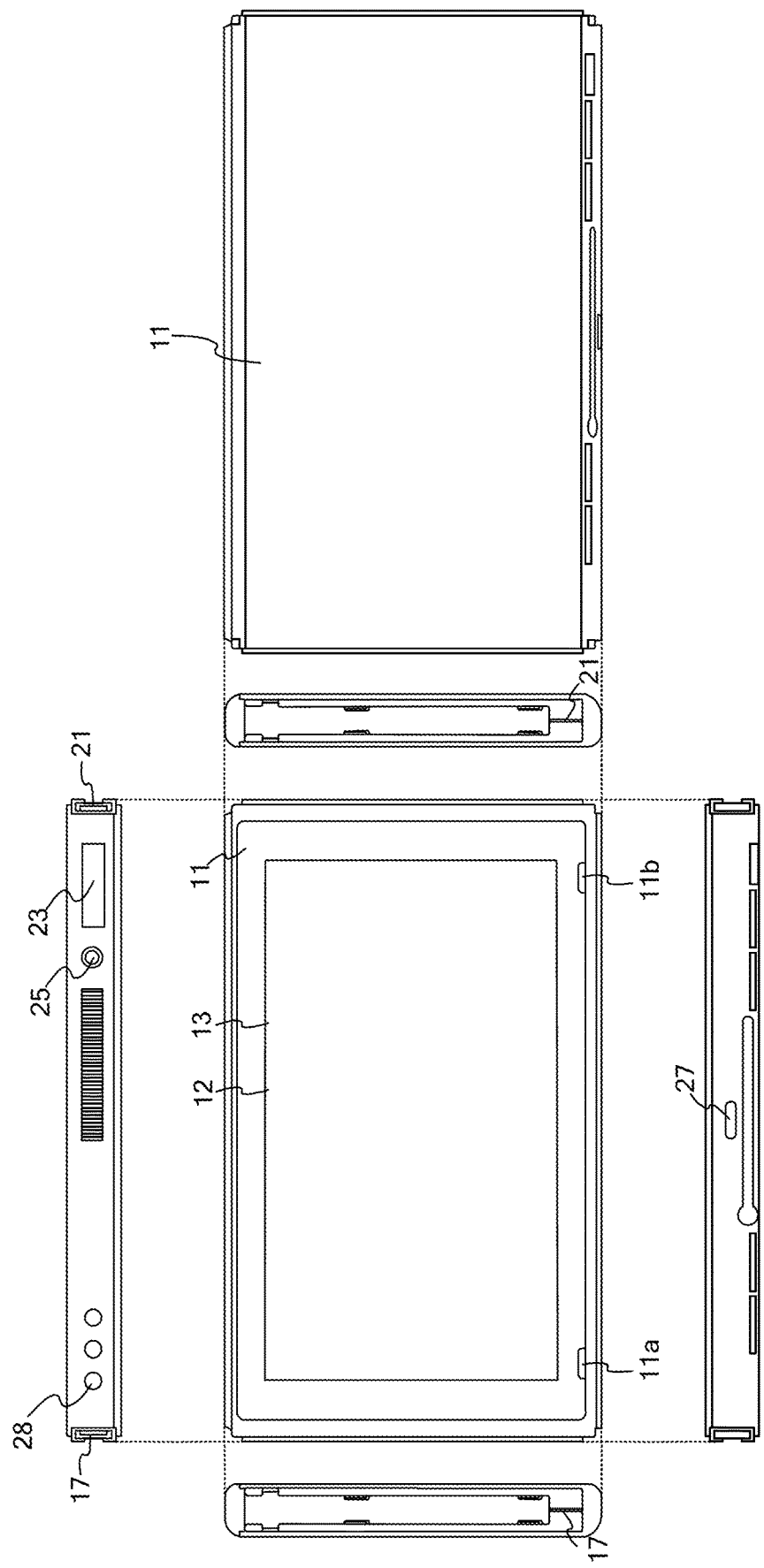
FIG. 3 is example non-limiting six orthogonal views showing an example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
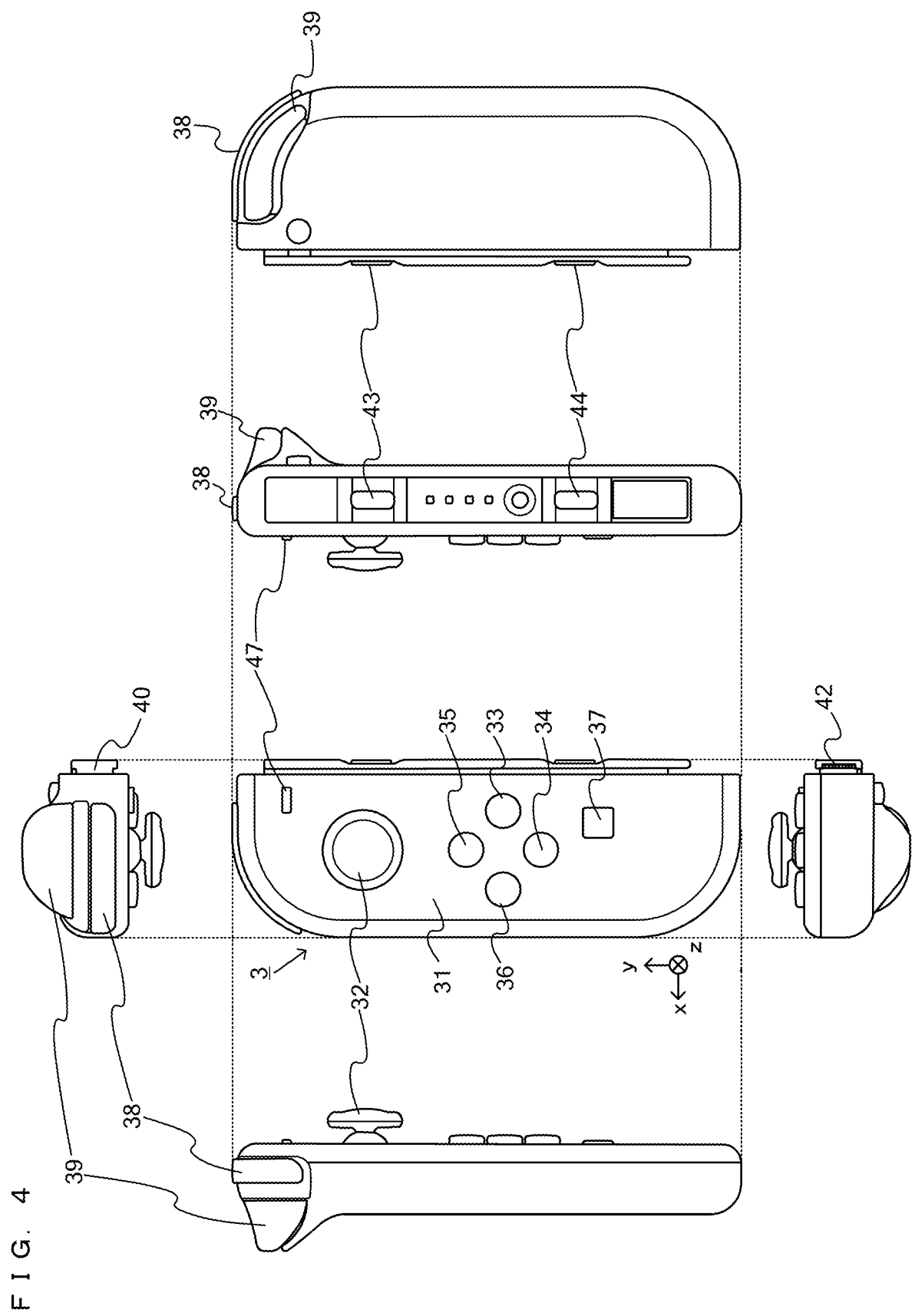
FIG. 4 is example non-limiting six orthogonal views showing an example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
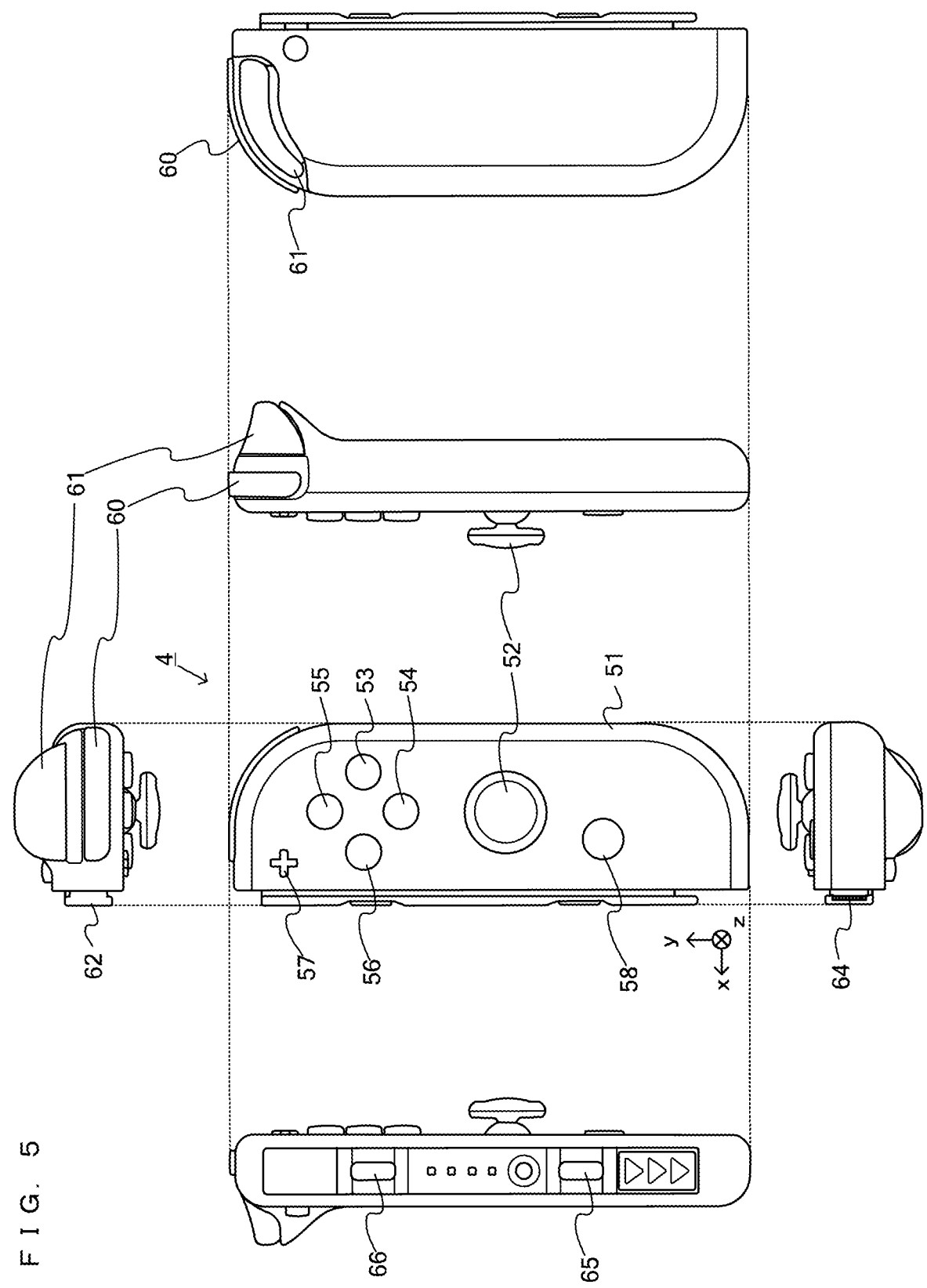
FIG. 5 is an example non-limiting six orthogonal views showing an example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
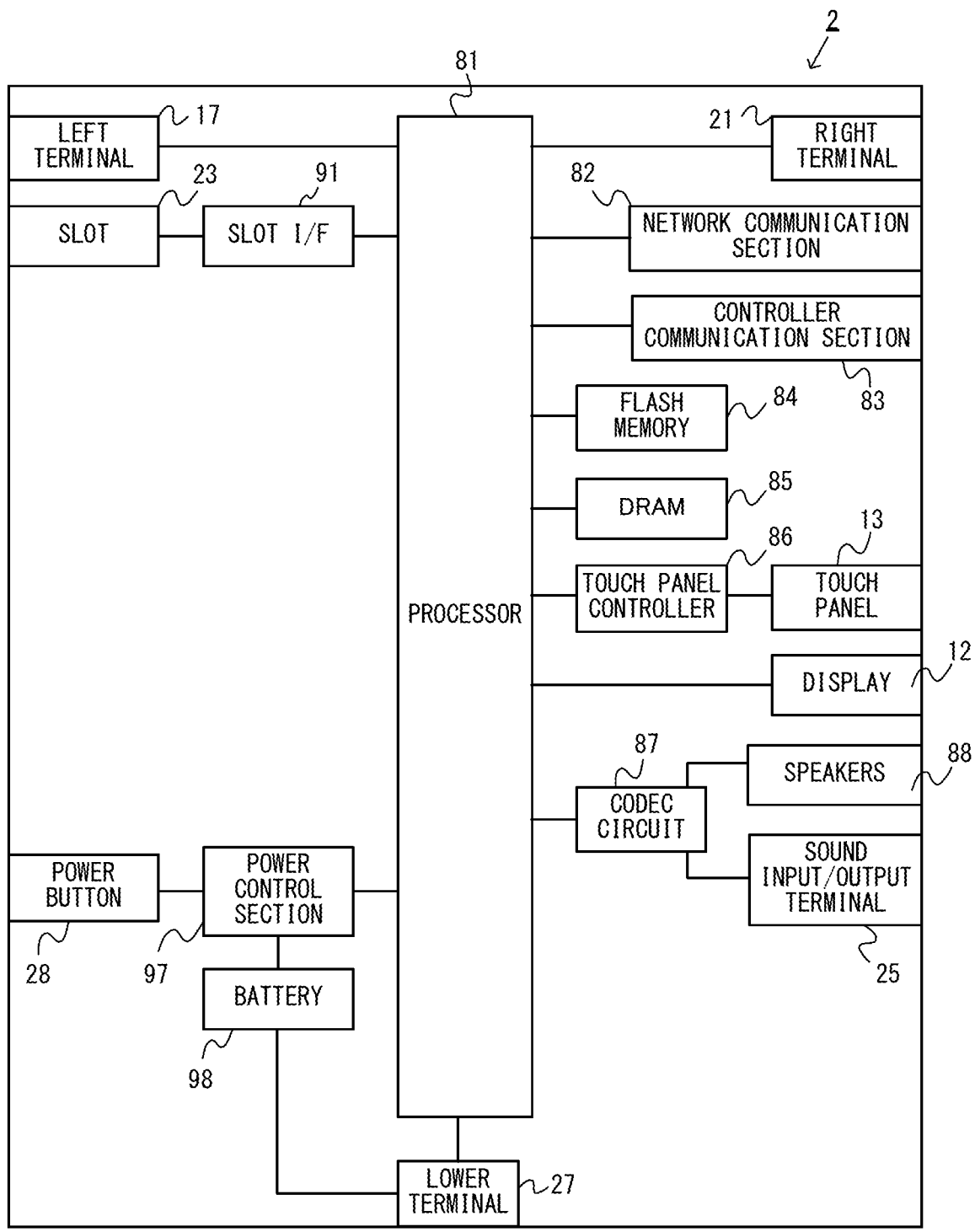
FIG. 6 is an example non-limiting block diagram showing an example of an internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
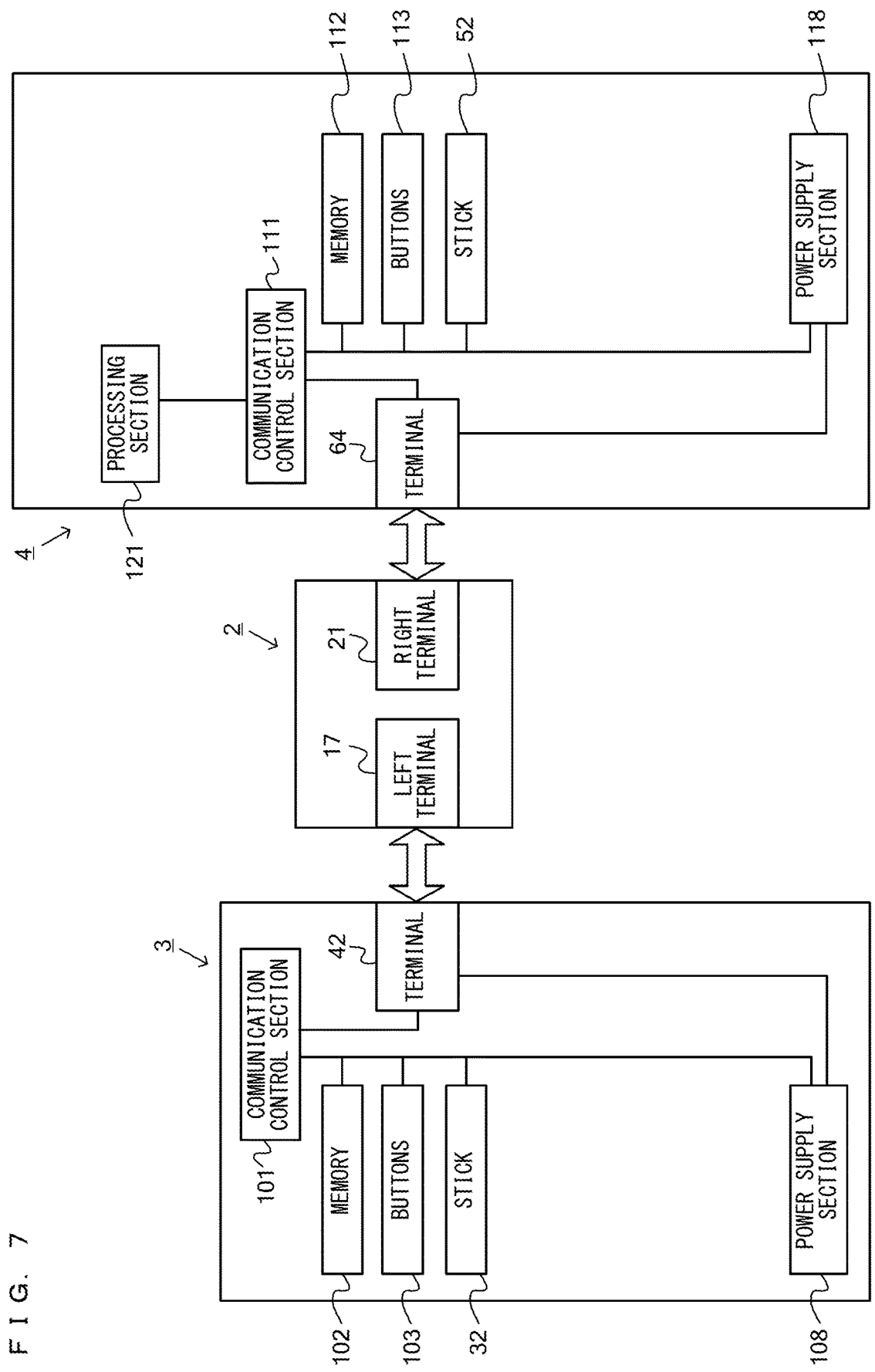
FIG. 7 is an example non-limiting block diagram showing examples of internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a processing section 121. The processing section 121 is connected to the communication control section 111.

The right controller 4 includes a power supply section 118. The power supply section 118 has a function similar to that of the power supply section 108 of the left controller 3 and operates similarly to the power supply section 108.

(Game and Method for Storing Game Image According to Exemplary Embodiment)

Figure 8:
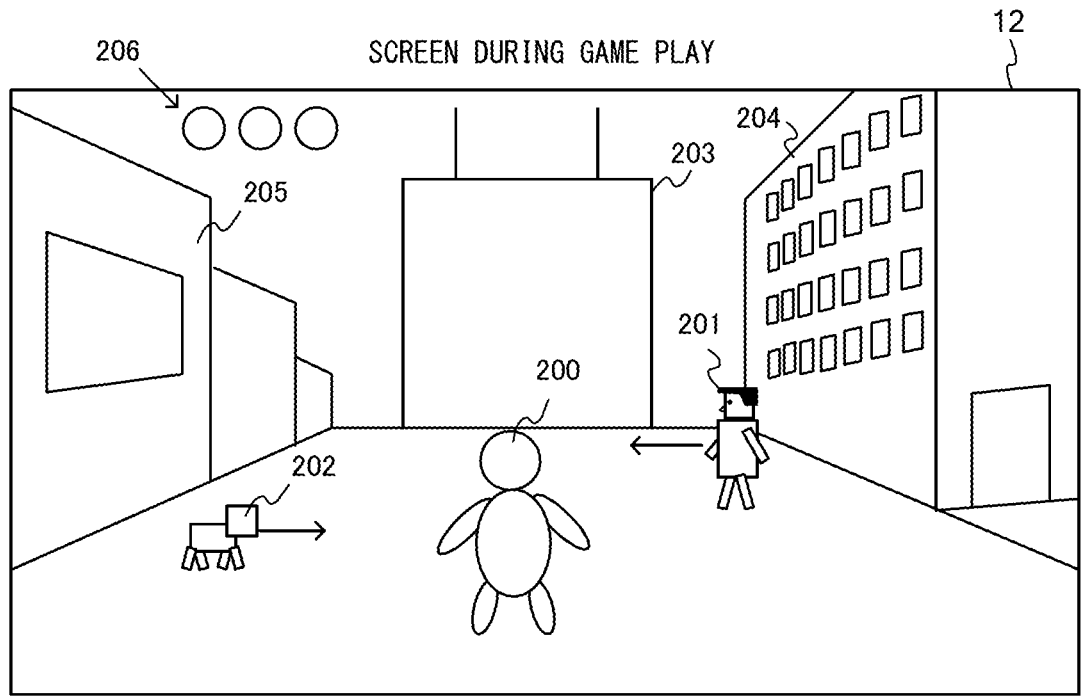
FIG. 8 is an example non-limiting diagram showing an example of a game image displayed during game play according to an exemplary embodiment.

Next, a game and a method for storing a game image according to the exemplary embodiment will be described. FIG. 8 is an example non-limiting diagram showing an example of a game image displayed during game play according to the exemplary embodiment. For example, an external storage medium having a game program stored therein is mounted in the slot 23, and, when a player makes an instruction for starting a game, the game image as shown in FIG. 8 is displayed on the display 12. The game image may be displayed on an external stationary monitor.

When the game according to the exemplary embodiment is started, a virtual space is defined, and a player character to be operated by a player, non-player characters controlled by the game system 1 (specifically, the processor 81), a virtual camera, and other objects are disposed in the virtual space. FIG. 8 shows an example of an image of the virtual space generated based on the virtual camera.

As shown in FIG. 8, a player character 200 and non-player characters (hereinafter, represented as "NPC") 201 and 202 are displayed on the display 12. A tower object 203 and building objects 204 and 205 are also displayed on the display 12. A physical strength indication 206 representing a physical strength value (or remaining lives) of the player character 200 is displayed in the upper left portion of the screen of the display 12.

The player character 200 moves or jumps in the virtual space according to an operation performed by a player. For example, the player character 200 moves in the virtual space according to an operation on the analog stick 32 of the left controller 3. The player character 200 jumps in the virtual space according to an operation on the A-button 53 of the right controller 4.

Meanwhile, the NPCs 201 and 202 are controlled by the game system 1. For example, the NPCs 201 and 202 move in the virtual space in the left-right direction shown in FIG. 8. The NPCs 201 and 202 are opponent characters, and, when the player character 200 contacts with the NPC 201 or 202, the physical strength value of the player character 200 is reduced, and three "round marks" in the physical strength indication 206 are reduced by one. For example, when the physical strength value becomes "0" (the number of the round marks of the physical strength indication 206 becomes "0"), the game is over.

In the game of the exemplary embodiment, a player plays the game while holding the game system 1 such that the display 12 is basically oriented so as to be laterally elongated. In the game of the exemplary embodiment, a "game mode" and an "imaging mode" are executed.

The game mode is a mode in which a normal game play is performed as shown in FIG. 8. In the game mode, the player character 200 moves according to an operation performed by a player. In the game mode, the NPC is operated by the game system 1. Moreover, in the game mode, a time that elapses since the start of the game is measured. For example, when a predetermined time has elapsed since the start of the game, the game is over.

The imaging mode is a mode in which an image displayed on the display 12 is stored as a still image according to an operation performed on the record button 37 by a player. In the imaging mode, the player character 200 and the NPCs do not move, and are stationary. That is, in the imaging mode, moving of the player character 200 according to an operation performed by a player, and moving of the NPCs performed by the game system 1 are not performed, and the progress of the game is temporarily stopped. Furthermore, in the imaging mode, measurement of the elapse of time since the start of the game is also temporarily stopped.

In the imaging mode, when an operation is performed on the record button 37, an image displayed on the display 12 is stored in a predetermined storage medium (for example, flash memory). In the exemplary embodiment, when the operation is performed on the record button 37, the image displayed on the display 12, and rotation information of the image are stored in the storage medium. For example, the rotation information may be rotation information according to EXIF (Exchangeable image file format) information. In addition to the rotation information, information representing a date and time when the image has been taken or a resolution of the image may be stored together with the image as additional information. Hereinafter, an image stored in a storage medium according to an operation on the record button 37 may be referred to as "snapshot image".

The rotation information of an image is information for determining a degree by which the image is to be rotated when another device (for example, smartphone or tablet terminal, personal computer, or the like) displays the snapshot image on a display device. Examples of the rotation information of an image include information representing "no rotation", information representing "90 degrees rotation in the counterclockwise direction", information representing "90 degrees rotation in the clockwise direction", and information representing "180 degrees rotation". In the exemplary embodiment, the rotation information stored together with a snapshot image in a storage medium is information representing "no rotation", information representing "90 degrees rotation in the counterclockwise direction", or information representing "90 degrees rotation in the clockwise direction".

In a case where the information representing "90 degrees rotation in the clockwise direction" is stored as the rotation information of an image, when the image is displayed on another device, the image is rotated by 90 degrees in the clockwise direction and displayed. In a case where the information representing "90 degrees rotation in the counterclockwise direction" is stored as the rotation information of an image, when the image is displayed on another device, the image is rotated by 90 degrees in the counterclockwise direction and displayed. In a case where the information representing "no rotation" is stored as the rotation information of an image, when the image is displayed on another device, the image is not rotated.

The game mode is switched to the imaging mode (or the imaging mode is switched to the game mode) according to a switching operation performed by a player. For example, when a button (for example, any of the buttons 33 to 36) of the left controller 3 is pressed in the game mode, the game mode is switched to the imaging mode (or the imaging mode is switched to the game mode). In a case where the game mode is switched to the imaging mode, at a time when the operation of switching to the imaging mode has been performed, a game image displayed on the display 12 is displayed as a still image on the display 12.

Figure 9:
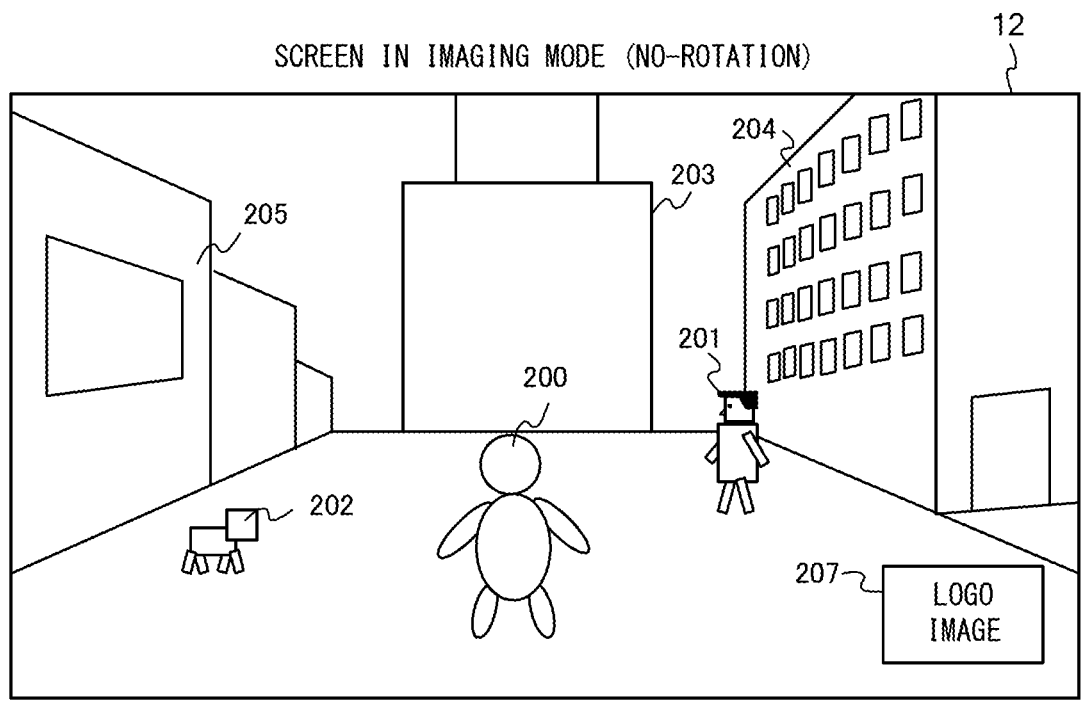
FIG. 9 is an example non-limiting diagram showing an example of an image displayed in an imaging mode.

FIG. 9 is an example non-limiting diagram showing an example of an image displayed in the imaging mode. As shown in FIG. 9, in the imaging mode, a part of the image displayed in the game mode is not displayed. Specifically, the physical strength indication 206 representing a state of the game is not displayed in the imaging mode. In the game mode, a dialogue (texts) uttered by the player character 200 or the NPC 201, 202 may be displayed. Furthermore, for example, when the player character 200 is positioned at a certain place in the virtual space, texts may be displayed on the screen. The text thus displayed according to the state of the game in the game mode, is not displayed when the game mode has been switched to the imaging mode. Also in the imaging mode, the physical strength indication 206 representing a state of a game, or texts such as a dialogue displayed according to the state of the game may be displayed.

In the imaging mode, a logo image 207, which is not displayed in the game mode, is displayed. The logo image 207 is displayed, for example, in the lower right portion of the screen. The position of the logo image 207 may be changed to any of the lower left portion, the lower right portion, the upper right portion, and the upper left portion of the screen according to an operation performed by a player. Furthermore, according to an operation performed by a player, the logo image 207 may not be displayed. An image, other than the logo image, which is not displayed in the game mode may be displayed in the imaging mode. For example, an explanation of an operation in the imaging mode may be displayed.

An image displayed in the imaging mode as shown in FIG. 9 is generated based on the virtual camera disposed in the virtual space. In the imaging mode, the position and the orientation of the virtual camera are changed according to an operation performed by a player.

Figure 10:
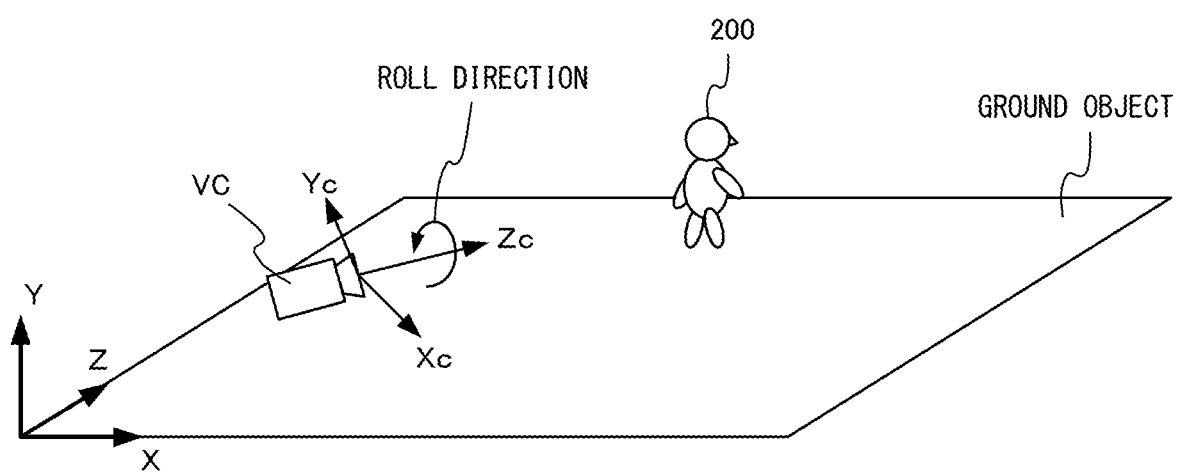
FIG. 10 is an example non-limiting diagram showing rotation of a virtual camera in a roll direction in the imaging mode.

FIG. 10 is an example non-limiting diagram showing rotation of the virtual camera in a roll direction in the imaging mode. In the virtual space, an XYZ orthogonal coordinate system which is fixed with respect to the virtual space is set. For example, the Y-axis extends upward in the virtual space. The X-axis and the Z-axis are set so as to be perpendicular to the Y-axis. A ground object is disposed on the XZ-plane. In the game mode, the player character 200 and the NPCs move on the ground object.

As shown in FIG. 10, a virtual camera VC is set in the virtual space. For the virtual camera VC, an XcYcZc orthogonal coordinate system which is fixed with respect to the virtual camera VC is set. The Xc-axis extends in the rightward direction of the virtual camera VC. The Yc-axis extends in the upper direction of the virtual camera VC. The Zc-axis extends in the line-of-sight direction (imaging direction) of the virtual camera VC. In the imaging mode, the virtual camera VC rotates around the Zc-axis (in the roll direction) according to an operation performed by a player. For example, the virtual camera VC rotates in the roll direction according to an operation on the ZL-button 39 of the left controller 3 or the ZR-button 61 of the right controller 4. In a specific scene, rotation in the roll direction may be restricted.

Figure 11:
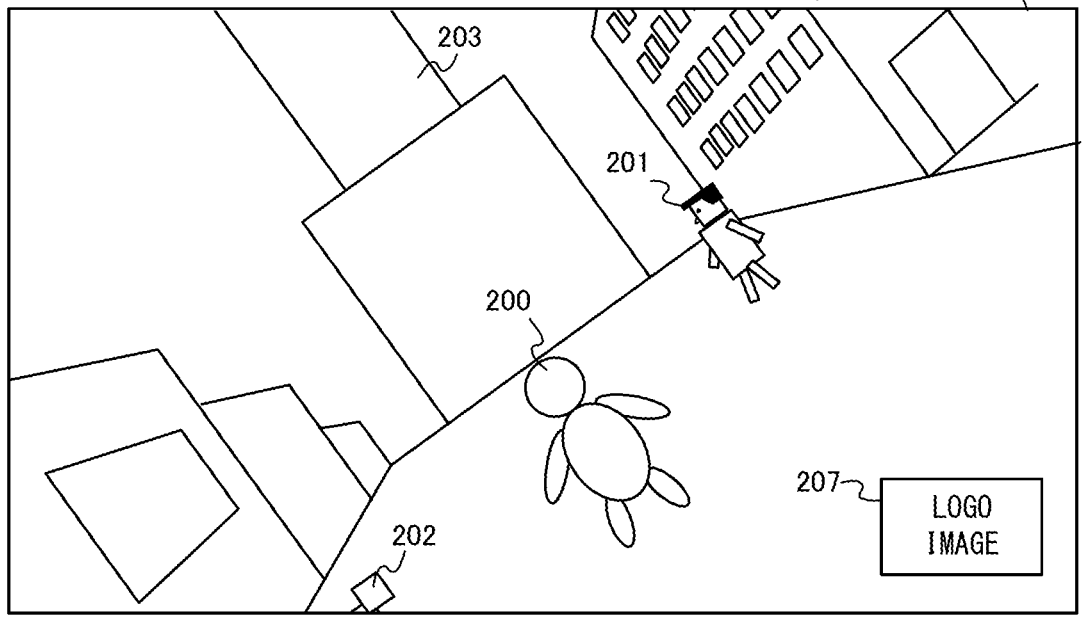
FIG. 11 is an example non-limiting diagram showing an example of an image obtained when a virtual camera VC is rotated in a roll direction (clockwise direction) in the imaging mode.
Figure 12:
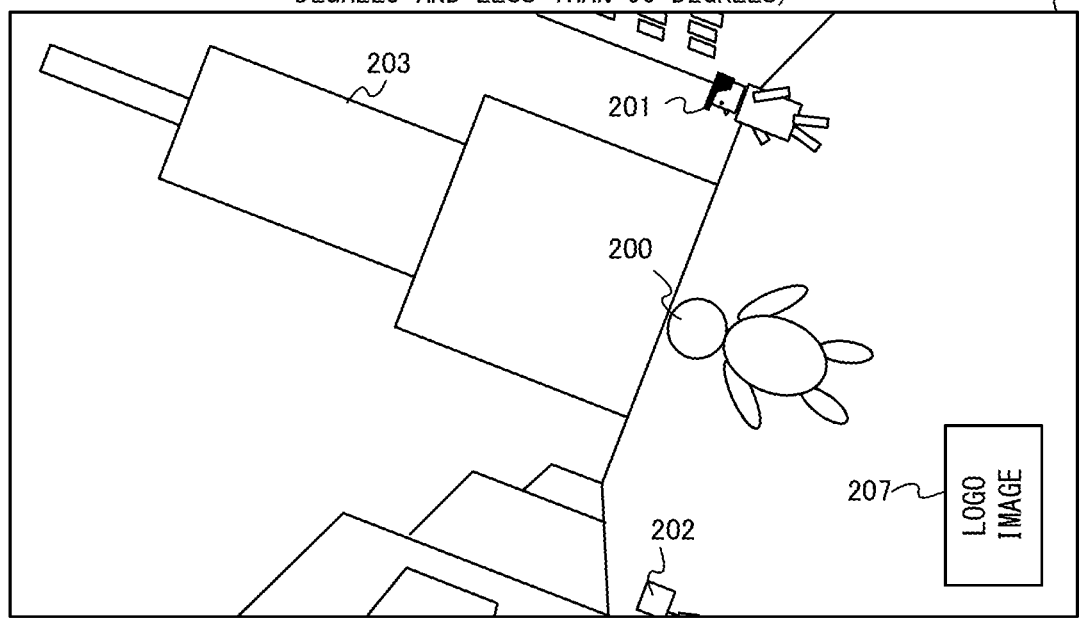
FIG. 12 is an example non-limiting diagram showing an example of an image obtained when the virtual camera VC is further rotated in the roll direction (clockwise direction) in the state shown in FIG. 11.

FIG. 11 is an example non-limiting diagram showing an example of an image obtained when the virtual camera VC is rotated in the roll direction (clockwise direction) in the imaging mode. FIG. 12 is an example non-limiting diagram showing an example of an image obtained when the virtual camera VC is further rotated in the roll direction (clockwise direction) in the state shown in FIG. 11.

When, for example, the ZL-button 39 is pressed in the imaging mode, the virtual camera VC rotates in the roll direction (clockwise direction). When, for example, the ZR-button 61 is pressed in the imaging mode, the virtual camera VC rotates in the roll direction (counterclockwise direction). The game system 1 determines whether or not the ZL-button 39 or the ZR-button 61 has been pressed, at predetermined time intervals (for example, at intervals of 1/60 seconds). In a case where the ZL-button 39 or the ZR-button 61 has been pressed, the virtual camera VC is rotated by a predetermined angle (for example, 1° to 2°) in the roll direction (clockwise direction or counterclockwise direction). The game system 1 generates an image of the virtual space which is viewed from the virtual camera VC having been rotated, and displays the generated image on the display 12.

As shown in FIG. 11, the image of the virtual space which is viewed from the virtual camera VC having been rotated in the roll direction (clockwise direction) is displayed on the display 12. In FIG. 11, the entirety of the image has been rotated in the counterclockwise direction (the virtual camera VC has been rotated in the clockwise direction). Meanwhile, the logo image 207 displayed in the lower right portion of the display 12 is not rotated. At this time, when an operation is performed on the record button 37, the image obtained by the entirety of the image being rotated in the counterclockwise direction as shown in FIG. 11 is stored as a snapshot image together with the rotation information of the image in a storage medium (for example, flash memory 84). At this time, information representing "no rotation" is stored as the rotation information of the image.

When the ZL-button 39 is further pressed in the state shown in FIG. 11, the virtual camera VC is further rotated in the roll direction (clockwise direction) (FIG. 12). Thus, the entirety of the image is further rotated in the counterclockwise direction as shown in FIG. 12. At this time, the logo image 207 displayed in the lower right portion of the display 12 is also rotated by 90 degrees in the counterclockwise direction. At this time, when an operation is performed on the record button 37, an image obtained by the entirety of the image being rotated in the counterclockwise direction as shown in FIG. 12 is stored as a snapshot image together with the rotation information of the image in the storage medium. Specifically, information representing "90 degrees rotation in the clockwise direction" is stored as the rotation information of the image.

Whether the information representing "no rotation" is stored as the rotation information as shown in FIG. 11 or the information representing "90 degrees rotation in the clockwise direction (or 90 degrees rotation in the counterclockwise direction)" is stored as the rotation information as shown in FIG. 12" is determined according to a rotation angle of the virtual camera VC in the roll direction.

FIG. 13 is an example non-limiting diagram showing an example of a criterion for determining the rotation information of an image. As shown in FIG. 13, in the plane perpendicular to the Zc-axis of the virtual camera VC, an angle r between the Yc-axis in the upward direction of the virtual camera VC and the Y-axis in the upward direction of the virtual space is calculated. The rotation in the counterclockwise direction is represented by a positive rotation angle, and the rotation in the clockwise direction is represented by a negative rotation angle. The angle r may be varied in the range from "−90 degrees" to "90 degrees". That is, in the exemplary embodiment, the virtual camera VC is able to rotate in the roll direction in the range from "−90 degrees" to "90 degrees". In another exemplary embodiment, the virtual camera VC may be rotated in the roll direction in the range from "−180 degrees to "180 degrees".

The virtual camera VC may be rotated in the pitch direction (in such a direction as to view the virtual space from thereabove or view the virtual space from therebelow) as described below. When the virtual camera VC is rotated in the pitch direction, the Y-axis of the virtual space is projected onto the plane perpendicular to the Zc-axis, and an angle between the Yc-axis and the projected Y-axis is calculated as the angle r.

In a case where, for example, the angle r between the Yc-axis in the upward direction of the virtual camera VC and the Y-axis in the upward direction of the virtual space is less than "−60 degrees", the information representing "90 degrees rotation in the clockwise direction" is determined as the rotation information. That is, in a case where the virtual camera VC is rotated in the clockwise direction by an angle greater than 60 degrees (that is, the entirety of the image displayed on the display 12 is rotated in the counterclockwise direction by an angle greater than 60 degrees), the information representing "90 degrees rotation in the clockwise direction" is determined as the rotation information. In this case, the logo image 207 is rotated by 90 degrees in the counterclockwise direction on the screen.

Furthermore, in a case where, for example, the angle r is greater than "60 degrees", the information representing "90 degrees rotation in the counterclockwise direction" is determined as the rotation information. That is, in a case where the virtual camera VC is rotated in the counterclockwise direction by an angle greater than 60 degrees (that is, the entirety of the image displayed on the display 12 is rotated in the clockwise direction by an angle greater than 60 degrees), the information representing "90 degrees rotation in the counterclockwise direction" is determined as the rotation information. In this case, the logo image 207 is rotated by 90 degrees in the clockwise direction on the screen.

When the angle r is not less than "−60 degrees" and not greater than "60 degrees", the information representing "no rotation" is determined as the rotation information. In this case, the logo image 207 is not rotated on the screen.

The rotation information determined based on the angle r is stored together with the image displayed on the screen, in the storage medium, according to an operation on the record button 37.

Figure 14:
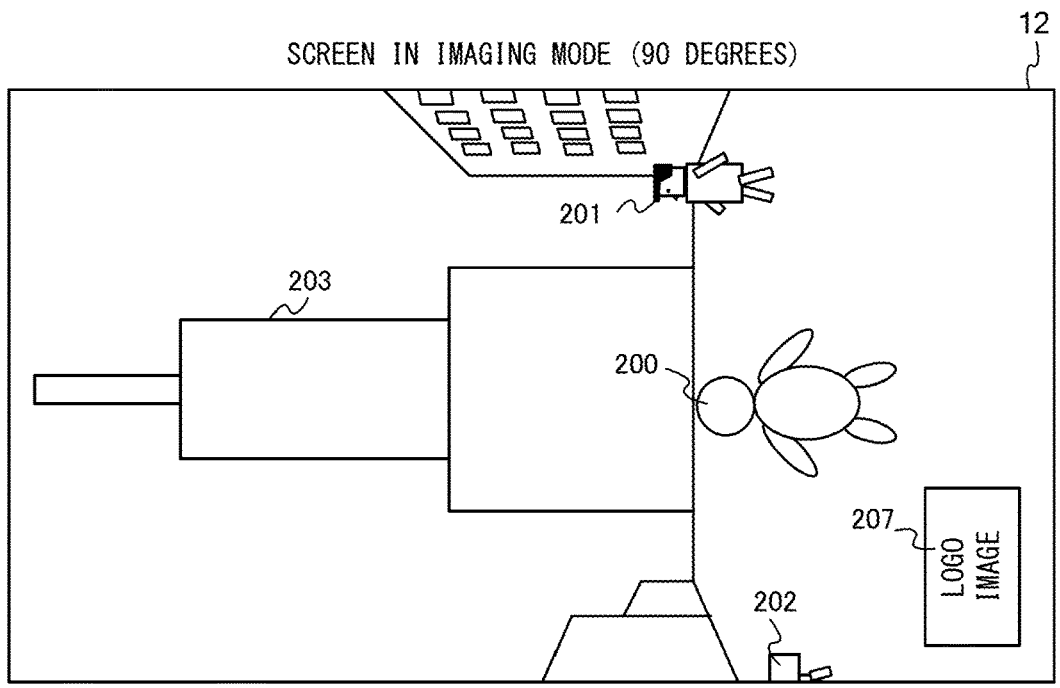
FIG. 14 is an example non-limiting diagram showing an example of an image obtained when the virtual camera VC is further rotated in the roll direction (clockwise direction) in the state shown in FIG. 12.
Figure 15:
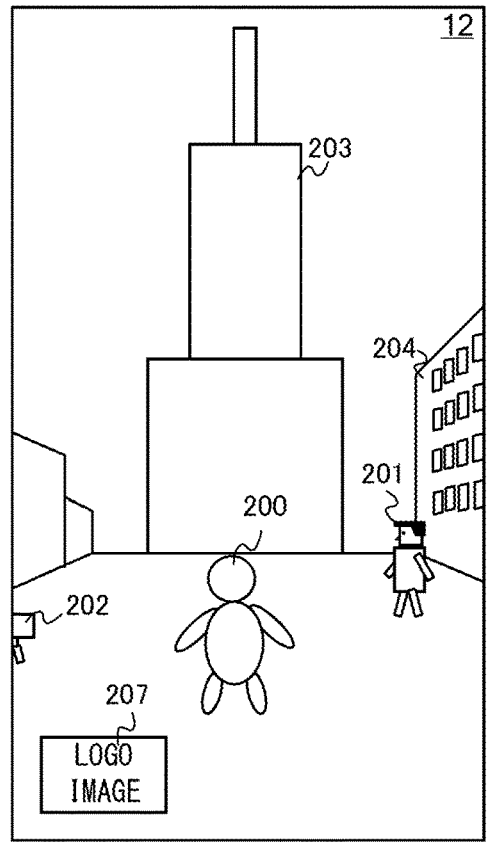
FIG. 15 is an example non-limiting diagram showing a state where a display 12 is held so as to be longitudinally elongated when the image shown in FIG. 14 is displayed.

FIG. 14 is an example non-limiting diagram showing an example of an image obtained when the virtual camera VC is further rotated in the roll direction (clockwise direction) in the state shown in FIG. 12. FIG. 15 is an example non-limiting diagram showing a state where the display 12 is held so as to be longitudinally elongated when the image shown in FIG. 14 is displayed.

When the ZL-button 39 is further pressed in the state shown in FIG. 12, the virtual camera VC is further rotated in the roll direction (clockwise direction) (FIG. 14). As shown in FIG. 14, the logo image 207 displayed in the lower right portion of the display 12 does not change from the state shown in FIG. 12. As shown in FIG. 14, an image having been rotated by 90 degrees in the counterclockwise direction in the state shown in FIG. 9 is displayed on the display 12.

At this time, when an operation is performed on the record button 37, the image shown in FIG. 14 is stored together with the rotation information of the image as a snapshot image in the storage medium. At this time, the information representing "90 degrees rotation in the clockwise direction" is stored as the rotation information of the image.

As shown in FIG. 14 and FIG. 15, when the virtual camera VC is rotated in the roll direction by 90 degrees, the image is longitudinally elongated. A part of the tower object 203, which is not displayed in the laterally elongated image shown in FIG. 9, is displayed in FIG. 14 and FIG. 15. Furthermore, the building object 205 displayed on the left side of the screen in FIG. 9 is not displayed in FIG. 14 and FIG. 15. That is, in a case where the virtual camera VC is rotated in the roll direction by 90 degrees, an image that is wide in the up-down direction of the virtual space and is narrow in the left-right direction thereof as compared to a case where the virtual camera VC is not rotated, is displayed. Thus, in the imaging mode, by the virtual camera VC being rotated in the roll direction, an image including the player character 200 and the entirety of the tower object 203 is displayed, and the image is able to be stored in the storage medium as a snapshot image according to an operation on the record button 37.

(Display of Snapshot Image on Another Device)

The snapshot image stored in storage medium according to an operation on the record button 37 is able to be displayed on another device (for example, smartphone). For example, the game system 1 and the smartphone are connected to each other by a wired or wireless connection, and both the snapshot image and the rotation information are transmitted to the other device. The snapshot image and the rotation information thereof, which are generated by the game system 1, are able to be copied to another device through a storage medium that is detachably mounted to the game system 1 and the other device. In a case where the snapshot image is displayed on the other device, the snapshot image is rotated according to the rotation information, and displayed.

Figure 16:
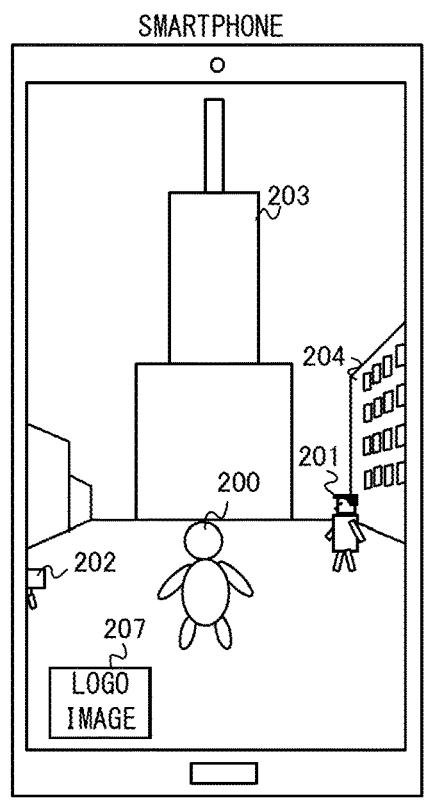
FIG. 16 is an example non-limiting diagram showing an example of a snapshot image, shown in FIG. 14, displayed on a smartphone.

FIG. 16 is an example non-limiting diagram showing an example of the snapshot image, shown in FIG. 14, displayed on a smartphone. As shown in FIG. 16, the smartphone has a longitudinally elongated screen. In a case where the information representing "90 degrees rotation in the clockwise direction" is stored as the rotation information of the image, the smartphone rotates the snapshot image by 90 degrees in the clockwise direction, based on the rotation information, and displays the rotated image. Thus, the longitudinally elongated image that meets the screen of the smartphone is able to be displayed on the smartphone.

As described above, in the exemplary embodiment, switching to the imaging mode is performed during the game according to an operation performed by a player. In the imaging mode, the state of the object in the virtual space is not updated. In the imaging mode, the virtual camera VC rotates around the axis of the line-of-sight direction of the virtual camera according to an operation performed by the player. The image (snapshot image) of the virtual space based on the virtual camera and the rotation information, of the image, which is determined according to the rotation of the virtual camera around the axis of the line-of-sight direction are stored in the storage medium according to an instruction from the player. Since both the rotation information and the snapshot image are stored, when the snapshot image is displayed on another device, the image is able to be rotated according to the rotation information, and displayed.

Thus, since one scene of a game performed by the game system 1 is stored, together with the rotation information of the image, as a snapshot image, for example, the image is able to be displayed as a longitudinally elongated image on a smartphone having a longitudinally elongated screen. For example, an image stored in the game system 1 is able to be used as a wall paper (background image) of a smartphone.

In a case where a snapshot image stored in the game system 1 is displayed on the display 12 of the game system 1, the game system 1 displays the image without rotating the image. That is, in a case where, for example, the image shown in FIG. 14 is stored as the snapshot image in the flash memory 84, when the stored image is displayed on the display 12, the image shown in FIG. 14 is displayed. This is because the display 12 is able to be held and oriented so as to be longitudinally elongated. Furthermore, in a case where, for example, the stored snapshot image is displayed on an external stationary monitor, the game system 1 may rotate the snapshot image by 90 degrees and display the rotated image, or may display the snapshot image without rotating the image.

In a case where the other device is not able to process the rotation information (for example, in a case where the other device is not supported under the EXIF), the other device displays the snapshot image without rotating the image.

Figure 17:
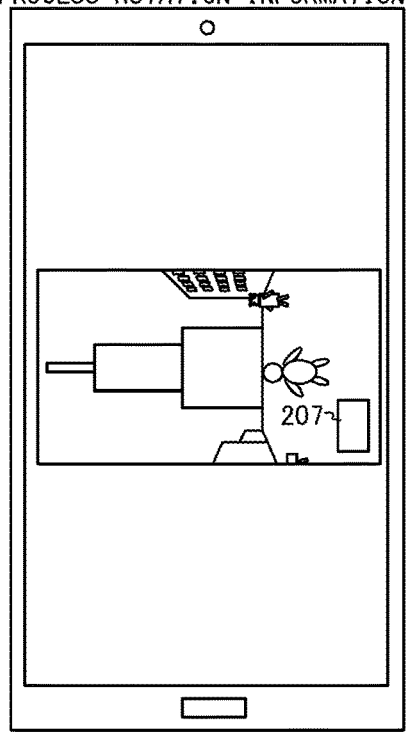
FIG. 17 is an example non-limiting diagram showing an example of the snapshot image displayed on another apparatus which cannot process rotation information.

FIG. 17 is an example non-limiting diagram showing an example of a snapshot image displayed on another apparatus which cannot process the rotation information.

As shown in FIG. 17, the other device has a longitudinally elongated screen. The other device is not able to process the rotation information stored together with the snapshot image and is not able to rotate the snapshot image. Therefore, the other device displays the snapshot image as a laterally elongated image on the screen. For example, the other device reduces the snapshot image in the lateral direction and the longitudinal direction and displays the resultant image on the screen as shown in FIG. 17.

(Other Operation in Imaging Mode)

Next, an operation, other than rotation of the virtual camera VC in the roll direction, which is able to be performed in the imaging mode will be described.

Figure 18:
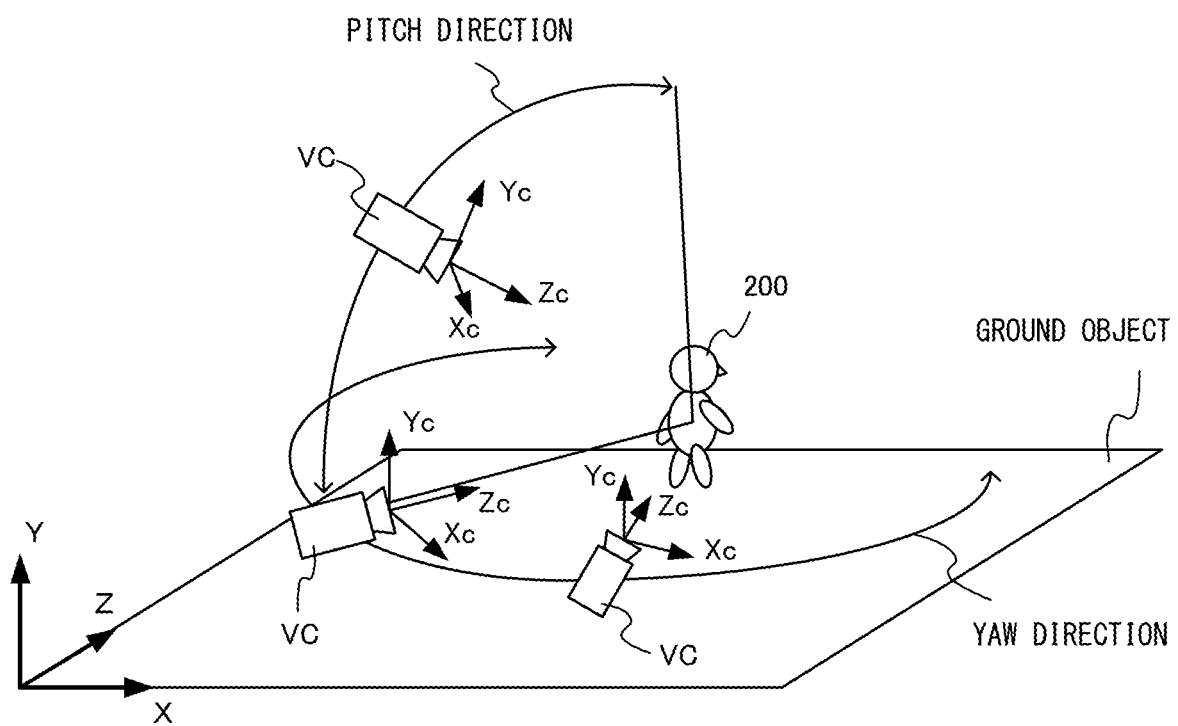
FIG. 18 is an example non-limiting diagram showing rotation of the virtual camera VC in a pitch direction and a yaw direction.

In the exemplary embodiment, the virtual camera VC is able to rotate in the pitch direction (around the Xc-axis) and the yaw direction (around the Yc-axis) as well as in the roll direction (around the Zc-axis). FIG. 18 is an example non-limiting diagram showing rotation of the virtual camera VC in the pitch direction and the yaw direction.

For example, the virtual camera VC rotates in the pitch direction and the yaw direction in the imaging mode according to an operation on the analog stick 52 of the right controller 4. For example, as shown in FIG. 18, when the left-right direction is input on the analog stick 52, the virtual camera VC rotates around the Yc-axis while the gaze point of the virtual camera VC is fixed onto the player character 200. At this time, the position of the virtual camera VC is also changed. For example, the virtual camera VC moves on a circle, around the player character 200, which is parallel to the XZ plane according to the input of the left-right direction on the analog stick 52.

Furthermore, as shown in FIG. 18, when the up-down direction is input on the analog stick 52, the virtual camera VC rotates around the Xc-axis while the gaze point of the virtual camera VC is fixed onto the player character 200. At this time, the position of the virtual camera VC is also changed. For example, the virtual camera VC moves on an arc of a sector of a circle around the player character 200 on the plane perpendicular to the XZ plane according to input of the up-down direction on the analog stick 52.

Thus, the virtual camera VC rotates also in the pitch direction and the yaw direction in the imaging mode according to an operation performed by a player. Therefore, the player is allowed to store, as the snapshot image, an image of the virtual space viewed at a desired angle.

Also in the game mode, as shown in FIG. 18, the virtual camera VC rotates in the pitch direction and the yaw direction according to an operation on the analog stick 52 of the right controller 4. Therefore, also in the game mode, a player is allowed to play a game while viewing the virtual space at a desired angle. However, in the game mode, the virtual camera VC does not rotate in the roll direction according to an operation performed by a player. Also in the game mode, the virtual camera VC may rotate in the roll direction according to an operation performed by a player. Furthermore, in a specific scene, rotation in the pitch direction and the yaw direction may be restricted.

In the imaging mode, the gaze point or the position (viewpoint) of the virtual camera VC may be changed in the virtual space according to an operation on the analog stick 32 of the left controller 3. In the imaging mode, an angle of view of the virtual camera VC may be changed according to an operation performed by a player.

Furthermore, in the imaging mode, for example, setting of zooming (zooming in or zooming out) of the virtual camera VC may be performed according to an operation on a predetermined button of the right controller 4.

(Selection of Filter)

Furthermore, a player is allowed to select a filter in the imaging mode. The "filter" is used to change a display manner for an image displayed on the display 12. When the filter is selected, a predetermined process is performed on an image based on the virtual camera VC, and the display manner for the image is changed. For example, in the exemplary embodiment, "blur", "sepia", "black-and-white", "low resolution", "line drawing", "dot drawing", "fish eye camera", "silhouette", and the like are prepared for the filter.

The "blur" filter is used to blur an image. The "sepia" filter is used to process the entirety of the image into a sepia image. The "black-and-white" filter is used to display the entirety of the image as a black-and-while image.

The "low resolution" filter is used to generate an image obtained based on the virtual camera VC such that the resolution of the image is lower than a normal resolution (resolution of an image in the game mode).

The "line drawing" filter is used to generate an image only by lines. When the "line drawing" filter is selected, an edge extraction process is performed on an image generated based on the virtual camera VC. The "dot-drawing" filter is used to generate an image only by dots. When the "dot-drawing" filter is selected, a feature (point) is extracted from an image generated based on the virtual camera VC, to generate the image for which the feature has been extracted.

The "fish eye camera" filter is used to generate a deformed image as obtained when the virtual space is viewed with a fish eye camera. When the "fish eye camera" filter is selected, an image generated based on the virtual camera VC is deformed.

The "silhouette" filter is used to display a silhouette image. For example, a three-dimensional image in which each pixel of the image is associated with a depth value, based on the virtual camera VC, is generated. The silhouette image is generated by using the depth value of the generated three-dimensional image.

Thus, the "filter" is used to perform a predetermined process (for example, process of deforming an image, process of blurring an image, process of changing a color tone of an image, process of changing a brightness of an image, process of changing a resolution of an image) on an image generated based on the virtual camera VC, and used to perform a process (for example, process of extracting a depth value, process of extracting an edge) of extracting a feature of a three-dimensional image generated based on the virtual camera VC.

For example, a player is allowed to select a filter according to an operation on a predetermined button of the left controller 3. When the filter is selected, an image having been subjected to the filter process (process of deforming an image, process of blurring an image, process of changing a color tone of an image, process of changing a brightness of an image, process of changing a resolution, process of extracting a feature of an image) according to the selected filter is displayed on the display 12. According to an operation being performed on the record button 37, the image having been subjected to the filter process, and the rotation information thereof are stored in the storage medium.

When the filter process is performed on an image of the virtual space based on the virtual camera VC, the display manner for the logo image 207 is not changed. Specifically, an image having been subjected to the filter process is rendered, and a predetermined logo image 207 is rendered so as to overlap the image. Thus, an image in which the image having been subjected to the filter process and the logo image 207 subjected to no filter process overlap each other, is generated and displayed. When the filter is selected, a display manner for images including the logo image 207 may be changed. Furthermore, an object corresponding to the logo image 207 is disposed in the virtual space and an image of the object is taken by the virtual camera, whereby an image of the virtual space including the logo image 207 may be generated.

(Detailed Description of Process)

Next, a process performed by the game system 1 will be described in detail. Firstly, data stored in the game system 1 will be described. Thereafter, information processing performed by the game system 1 will be described in detail.

Figure 19:
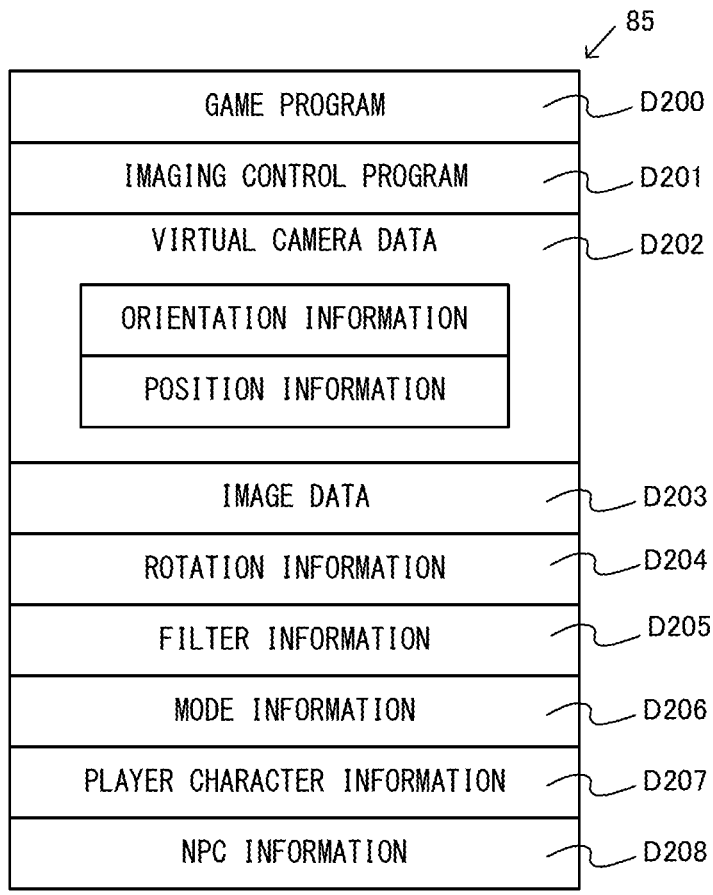
FIG. 19 is an example non-limiting diagram showing an example of data stored in a DRAM 85 of a game system 1.
Figure 20:
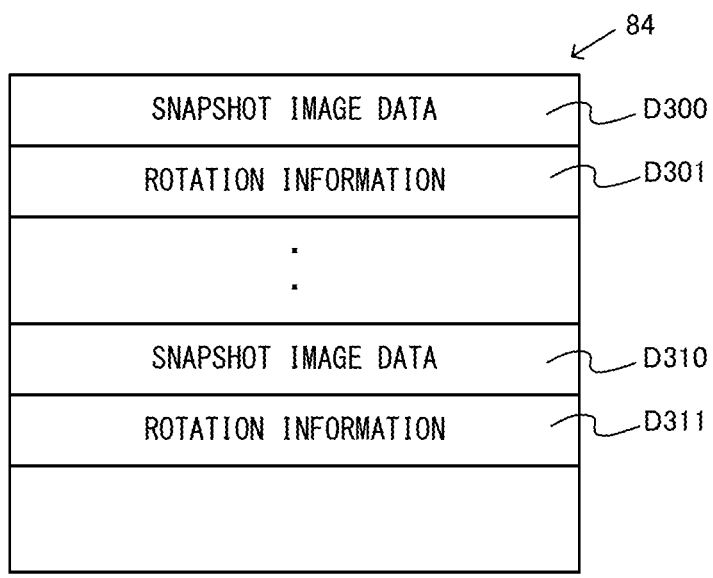
FIG. 20 is an example non-limiting diagram showing an example of data stored in a flash memory 84 of the game system 1.

FIG. 19 is an example non-limiting diagram showing an example of data stored in the DRAM 85 of the game system 1. FIG. 20 is an example non-limiting diagram showing an example of data stored in the flash memory 84 of the game system 1.

As shown in FIG. 19, in the DRAM 85 of the game system 1, a game program D200, an imaging control program D201, virtual camera data D202, image data D203, rotation information D204, filter information D205, mode information D206, player character information D207, and NPC information D208 are stored. In the DRAM 85 of the game system 1, various data and programs other than those shown in FIG. 19 are stored.

The game program D200 is a program for performing a game according to the exemplary embodiment, and is previously stored in an external storage medium mounted in the slot 23. The game program D200 is loaded from the external storage medium to the DRAM 85 when the game is started.

The imaging control program D201 is a program for storing, in a storage medium (for example, flash memory 84), a snapshot image and the rotation information in the imaging mode. The imaging control program D201 is previously stored in the main body apparatus 2 (for example, flash memory 84). The imaging control program D201 is loaded from the flash memory 84 to the DRAM 85 when, for example, the main body apparatus 2 is powered on.

The virtual camera data D202 includes orientation information and position information. The orientation information of the virtual camera data D202 includes a rotation angle of the virtual camera VC in the roll direction, a rotation angle thereof in the pitch direction, and a rotation angle thereof in the yaw direction. The position information of the virtual camera data D202 represents a position, a gaze point, and the like of the virtual camera VC in the virtual space.

The image data D203 represents an image of the virtual space generated based on the virtual camera VC. In the imaging mode, when the filter is applied, image data of an image to which the filter has been applied is stored as the image data D203. In the imaging mode, when the logo image 207 is added, an image obtained by the logo image 207 being added to an image of the virtual space generated based on the virtual camera VC is stored as the image data D203.

The rotation information D204 is data that represents the rotation information of the image data D203. For example, as the rotation information D204, information representing "no rotation", information representing "90 degrees rotation in the clockwise direction", and information representing "90 degrees rotation in the counterclockwise direction" are stored.

The filter information D205 represents a kind of a selected filter.

The mode information D206 is data that indicates whether the mode is the game mode or the imaging mode. In the mode information D206, a value representing the game mode is initially stored.

The player character information D207 is data that represents a state of the player character 200. Specifically, the player character information D207 includes data that represents a position, an action, a physical strength value (or remaining lives) of the player character 200.

The NPC information D208 is data that represents a state of an NPC (non-player character). Specifically, the NPC information D208 includes data that represents a position and an action of each non-player character.

Furthermore, as shown in FIG. 20, snapshot image data D300 is stored in the flash memory 84 of the game system 1. The snapshot image data D300 is copied from data in the DRAM 85 at a time when the record button 37 is pressed. The snapshot image data D300 is the same data as the image data D203 obtained at a time when the record button 37 is pressed. Rotation information D301 is added to the snapshot image data D300. The rotation information D301 is the same data as the rotation information D204 obtained at a time when the record button 37 is pressed. In the flash memory 84, the image data D203 and the rotation information D204 thereof each of which is obtained at a time when the record button 37 is pressed, are stored. For example, the image data D203 and the rotation information D204 thereof each of which is obtained at a certain time are stored as the snapshot image data D300 and the rotation information D301, and the image data D203 and the rotation information D204 thereof each of which is obtained at another time are stored as the snapshot image data D310 and the rotation information D311. In addition to the rotation information, information indicating a date and time when image has been taken, information indicating a resolution, and the like are stored as additional information of the snapshot image.

Figure 21:
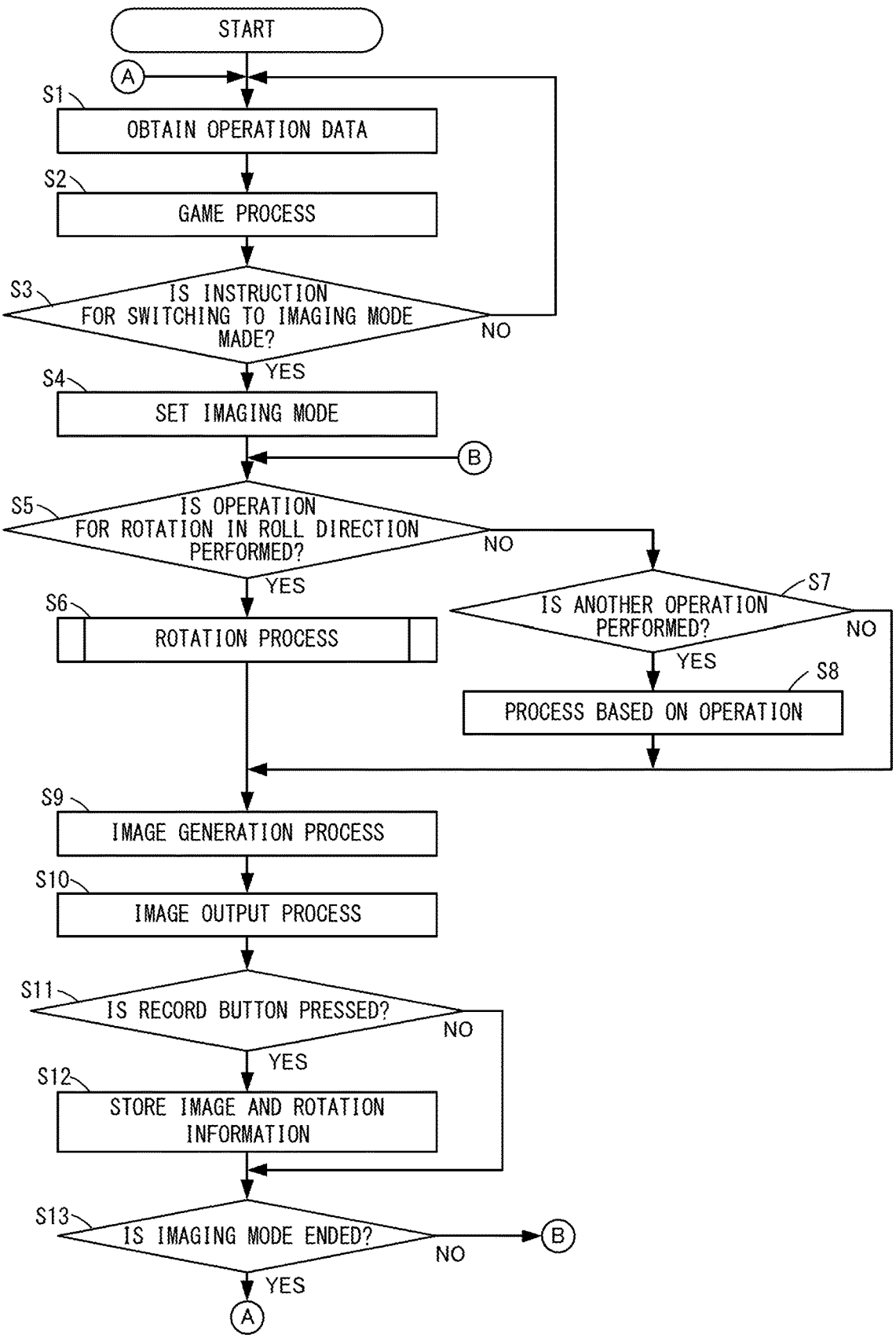
FIG. 21 is an example non-limiting flow chart showing in detail a process performed by the game system 1.

Next, a process performed by the game system 1 will be described in detail. FIG. 21 is an example non-limiting flow chart showing in detail a process performed by the game system 1. The process shown in FIG. 21 is performed by the game program D200 or the imaging control program D201 being executed by the processor 81 of the game system 1. In the game system 1, when an instruction for executing the game according to the exemplary embodiment is made, the process shown in FIG. 21 will start.

As shown in FIG. 21, the processor 81 obtains operation data representing an operation performed on each button or the analog stick of the controller (step S1). Subsequently, the processor 81 executes a game process based on the operation data (step S2).

Specifically, in the game process, the processor 81 updates a position of the player character 200 in the virtual space according to, for example, an operation on the analog stick 32. The processor 81 causes the player character 200 to jump according to, for example, an operation on the A-button 53 of the right controller 4. For example, when the player character 200 contacts with the NPC, the processor 81 reduces the physical strength value (or remaining lives) of the player character 200. The processor 81 stores data corresponding to a position, an action, and a physical strength value of the player character 200, as the player character information D207, in the DRAM 85. Furthermore, the processor 81 updates a position of the NPC (non-player character), or causes the NPC to perform a predetermined action. The processor 81 stores data corresponding to a position and an action of the NPC, as the NPC information D208, in the DRAM 85. The processor 81 updates a position of the virtual camera VC or rotates the virtual camera VC in the pitch direction or the yaw direction according to the operation data. The processor 81 stores data corresponding to a position and an orientation of the virtual camera VC, as the virtual camera data D202, in the DRAM 85. After these processes have been performed, the processor 81 generates an image of the virtual space based on the virtual camera VC, and stores the generated image as the image data D203 in the DRAM 85. The processor 81 displays, on, for example, the display 12, an image obtained by the physical strength indication 206 representing a physical strength value of the player character 200 being added to the image generated based on the virtual camera VC.

Next, the processor 81 determines whether or not an instruction for switching to the imaging mode has been made, according to the operation data (step S3). In a case where an instruction for switching to the imaging mode is not made (step S3: NO), the processor 81 executes the process step of step S1 again. The process of step S1 to step S3 is a process in the game mode. While an instruction for switching to the imaging mode is not made, the process of step S1 to step S3 is repeatedly performed at predetermined time intervals (for example, at intervals of 1/60 seconds). In a case where, while the process of step S1 to step S3 is performed, a player makes an instruction for ending the game play or the game is over, the processor 81 ends the process shown in FIG. 21.

In a case where, while the process of step S1 to step S3 is performed, the record button 37 is pressed, the processor 81 stores, in the flash memory 84, an image displayed on the display 12 at the time of the pressing. In this case, the physical strength indication 206 shown in FIG. 8 and texts representing a dialogue of the player character 200 or the NPC are also stored although the physical strength indication 206 and the texts are not displayed in the imaging mode.

In a case where an instruction for switching to the imaging mode has been made (step S3: YES), the processor 81 sets the imaging mode (step S4). Specifically, the processor 81 stores a value representing the imaging mode, in the mode information D206. In a case where the value representing the imaging mode is stored in the mode information D206, states (positions, actions, and the like) of the player character 200 and the NPCs are not updated. That is, in the imaging mode, the player character information D207 and the NPC information D208 are not updated. In a case where the value representing the imaging mode is stored in the mode information D206, measurement of the elapse of time since the start of the game is also stopped.

Subsequent to step S4, the process of step S5 to step S13 is performed. The process of step S5 to step S13 is a process in the imaging mode. The process of step S5 to step S13 is repeatedly performed at predetermined time intervals (for example, at intervals of 1/60 seconds). Also while the process of step S5 to step S13 is performed, the processor 81 repeatedly obtains the operation data.

Figure 22:
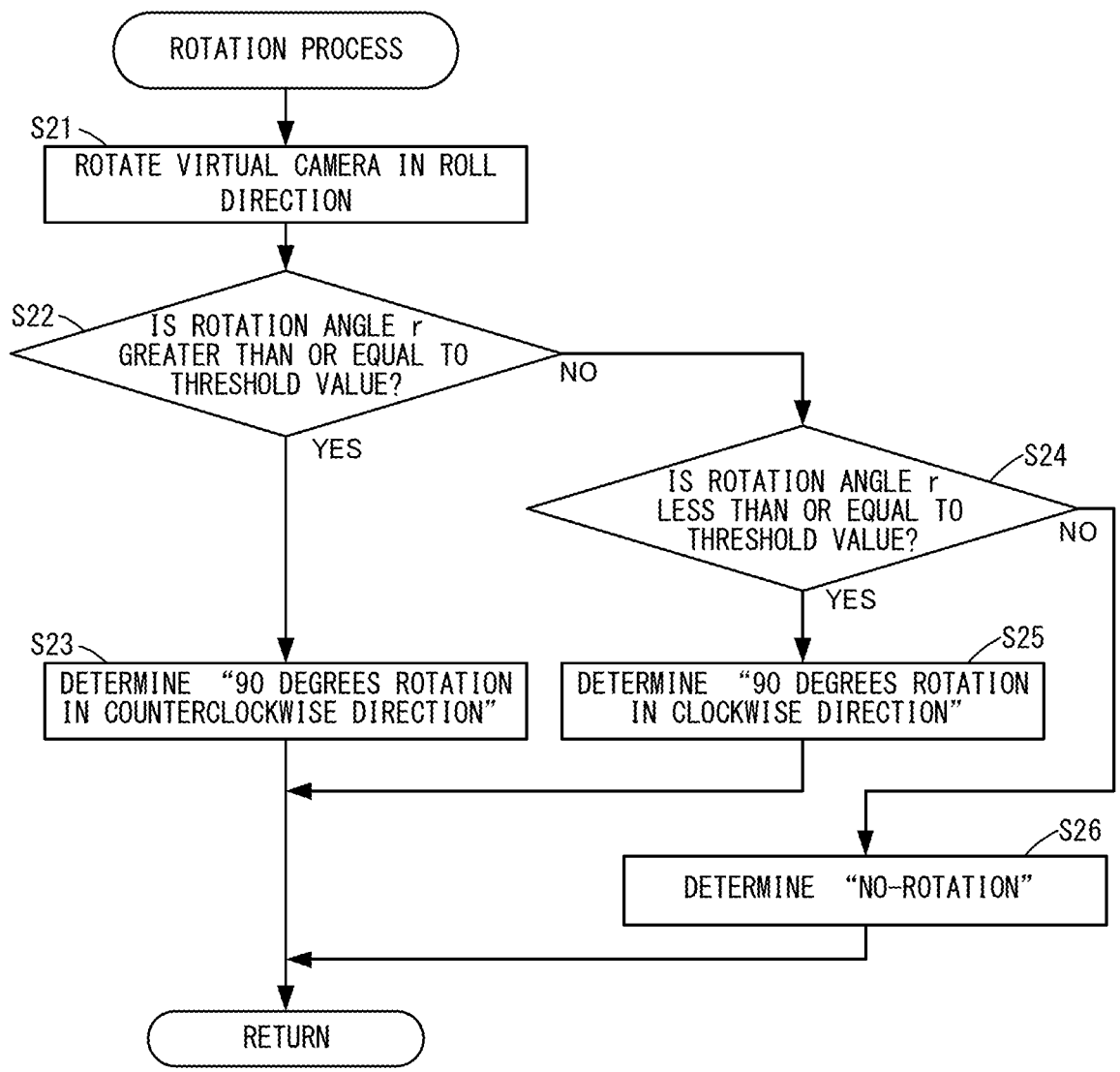
FIG. 22 is an example non-limiting flow chart showing in detail a rotation process in step S6.

In step S5, the processor 81 determines whether or not an operation for rotation in the roll direction has been performed. Specifically, the processor 81 determines whether or not an operation on the ZL-button 39 or the ZR-button 61 has been performed. In a case where it is determined that the operation for rotation in the roll direction has been performed (step S5: YES), the processor 81 performs a rotation process (step S6). The rotation process in step S6 is a process for rotating the virtual camera VC in the roll direction. Hereinafter, the rotation process in step S6 will be described in detail. FIG. 22 is an example non-limiting flow chart showing in detail the rotation process in step S6.

As shown in FIG. 22, the processor 81 rotates the virtual camera VC in the roll direction (axis of the line-of-sight direction) (step S21). For example, in a case where the ZL-button 39 is pressed, the processor 81 rotates the virtual camera VC in the clockwise direction by a predetermined angle. In a case where the ZR-button 61 is pressed, the processor 81 rotates the virtual camera VC in the counterclockwise direction by a predetermined angle. The processor 81 stores the orientation information of the virtual camera VC having been rotated, as the virtual camera data D202, in the DRAM 85.

Next, the processor 81 determines whether or not the rotation angle r of the virtual camera VC in the roll direction is greater than or equal to a predetermined threshold value (step S22). For example, the predetermined threshold value may be "60 degrees". In a case where the rotation angle r is greater than or equal to the predetermined threshold value (60 degrees) (step S22: YES), the processor 81 determines "90 degrees rotation in the counterclockwise direction", and stores information representing "90 degrees rotation in the counterclockwise direction", as the rotation information D204, in the DRAM 85 (step S23).

In a case where the determination in step S22 is NO, the processor 81 determines whether or not the rotation angle r is less than or equal to a predetermined threshold value (step S24). For example, the predetermined threshold value may be "−60 degrees". In a case where the rotation angle r is less than or equal to the predetermined threshold value (−60 degrees) (step S24: YES), the processor 81 determines "90 degrees rotation in the clockwise direction", and stores information representing "90 degrees rotation in the clockwise direction", as the rotation information D204, in the DRAM 85 (step S25).

In a case where the determination in step S24 is NO, the processor 81 determines "no rotation", and stores information representing "no rotation", as the rotation information D204, in the DRAM 85 (step S26).

In a case where the process step of step S23, step S25, or step S26 is performed, the processor 81 ends the process shown in FIG. 22.

Returning to FIG. 21, in a case where it is determined that the operation for rotation in the roll direction is not performed (step S5: NO), the processor 81 determines whether or not another operation has been performed (step S7). The "another operation" represents an operation other than rotation of the virtual camera VC in the roll direction, and is, for example, an operation of moving the virtual camera VC, an operation of rotating the virtual camera VC in the pitch direction or the yaw direction, an operation of selecting a filter, an operation of changing a position of the logo image 207, or an operation of selecting non-display of the logo image 207.

In a case where it is determined that any of the other operations has been performed (step S7: YES), the processor 81 performs a process according to the operation (step S8).

For example, in a case where an operation of moving the virtual camera VC is performed, the processor 81 moves the virtual camera VC in the virtual space, or changes the gaze point of the virtual camera VC. In a case where an operation of rotating the virtual camera VC in the pitch direction or the yaw direction is performed, the processor 81 rotates the virtual camera VC in the pitch direction or the yaw direction.

The processor 81 stores the virtual camera data D202 in the DRAM 85 according to the results of the process. In a case where an operation of selecting a filter is performed, the processor 81 sets a value corresponding to the selected filter, in the filter information D205. In a case where a filter is selected, the processor 81 performs a filter process corresponding to the selected filter, on the image generated based on the virtual camera VC, in the subsequent image generation process. In a case where an operation of changing a position of the logo image 207 is performed, the processor 81 changes the position at which the logo image 207 is displayed. In a case where an operation of selecting non-display of the logo image 207 is performed, the processor 81 sets the logo image 207 so as not to display the logo image 207.

When the process step of the step S6 has been performed, when the process step of step S8 has been performed, or when the determination in step S7 is NO, the processor 81 performs the image generation process (step S9).

Specifically, in step S9, the processor 81 generates an image of the virtual space based on the virtual camera VC.

In a case where a filter is selected in step S8, the processor 81 performs a filter process corresponding to the selected filter, on the image generated based on the virtual camera VC. For example, when the "blur" filter is selected, the processor 81 performs blur process on the image generated based on the virtual camera VC, whereby an image to which the "blur" filter has been applied is generated. In a case where the "line drawing" filter is selected, a process (process of extracting a feature) of extracting an edge of the image generated based on the virtual camera VC is performed, whereby an image to which the "line drawing" filter has been applied is generated. In a case where the "fish eye camera" filter is selected, the processor 81 deforms the image generated based on the virtual camera VC, whereby an image to which the "fish eye camera" filter has been applied is generated. In a case where the "silhouette" filter is selected, the processor 81 generates a silhouette image by using a depth value of the image generated based on the virtual camera VC.

The image generated based on the virtual camera VC (image to which the filter has not yet been applied) or an image obtained by the filter process having been performed on the image generated based on the virtual camera VC may be referred to as "virtual camera image".

The processor 81 adds the logo image 207 which is previously stored, to the generated "virtual camera image", and stores the resultant image as the image data D203 in the DRAM 85. At this time, the processor 81 rotates the logo image 207 according to the rotation information D204 set in the rotation process of step S6, and adds the logo image 207 having been rotated. For example, in a case where the information representing "90 degrees rotation in the clockwise direction" is set as the rotation information D204, the processor 81 rotates the logo image 207 by 90 degrees in the counterclockwise direction, and adds the resultant image to the "virtual camera image". In a case where the information representing "90 degrees rotation in the counterclockwise direction" is set as the rotation information D204, the processor 81 rotates the logo image 207 by 90 degrees in the clockwise direction, and adds the resultant image to the "virtual camera image". In a case where the information representing "no rotation" is set as the rotation information D204, the processor 81 adds the logo image 207 to the "virtual camera image" without rotating the logo image 207. In a case where non-display of the logo image 207 is set in step S8, the logo image 207 is not added. The physical strength indication 206 which is added in the game process of step S2 in the game mode is not added. Texts, representing a dialogue of the player character 200 or the NPC, which are displayed in the game mode are not rendered in the image generation process of step S9.

Subsequent to step S9, the processor 81 performs an image output process (step S10). Specifically, the processor 81 outputs, to the display 12, the image data D203 stored in the DRAM 85 in step S9.

Next, the processor 81 determines whether or not the record button 37 has been pressed (step S11). In a case where the record button 37 has been pressed (step S11: YES), the processor 81 stores, in the flash memory 84, the image data D203 and the rotation information D204 stored in the DRAM 85. In the flash memory 84, the image data D203 is stored as the snapshot image data D300, and the rotation information D204 is stored as the rotation information D301.

The process step of step S12 is performed by the processor 81 executing the imaging control program D201.

When the process step of step S12 has been performed, or when the determination in step S11 is NO, the processor 81 determines whether or not the imaging mode is to be ended (step S13). In a case where it is determined that the imaging mode is not to be ended, that is, in a case where a player does not make an instruction for ending the imaging mode (step S13: NO), the processor 81 performs the process step of step S5 again.

Meanwhile, in a case where it is determined that the imaging mode is to be ended, that is, in a case where a player makes an instruction for ending the imaging mode (step S13: YES), the processor 81 stores information representing the game mode, in the mode information D206, and performs the process step of step S1 again. Thus, switching from the imaging mode to the game mode is performed. Thereafter, the process of step S1 to step S3 is repeated, and the game which has been temporarily stopped is restarted. That is, the game is restarted from a state immediately preceding switching to the imaging mode. This is the end of the description with reference to FIG. 21.

The processes shown in FIG. 21 and FIG. 22 are merely examples. In FIG. 21 and FIG. 22, the order in which the steps are performed may be changed, another step may be added, or a part of the steps may be omitted. Furthermore, the numerical values used in the steps are merely examples, and other values may be used. For example, although "60 degrees" is used as the predetermined threshold value in step S22, the predetermined threshold value may be, for example, "45 degrees" or "75 degrees". Furthermore, although "−60 degrees" is used as the predetermined threshold value in step S24, the predetermined threshold value may be, for example, "−45 degrees" or "−75 degrees".

As described above, in the exemplary embodiment, in a case where a player performs an operation for switching to the imaging mode during the game play (step S1 to step S3), the game mode is switched to the imaging mode (step S4). In the imaging mode, actions of all the objects, in the virtual space, including the player character 200 and the NPCs are stopped. In the imaging mode, the virtual camera VC is rotated in the roll direction according to an operation performed by a player (step S6). In a case where the rotation angle (absolute value of rotation angle) of the virtual camera VC in the roll direction is greater than or equal to a predetermined threshold value (YES in step S22 or YES in step S24), "90 degrees rotation in the counterclockwise direction or clockwise direction" is determined as the rotation information of the image (step S23 or step S25).

According to an instruction from a player, the image (virtual camera image) generated based on the virtual camera VC is stored together with the rotation information of the image, in the storage medium, at the time of the instruction (step S12).

Thus, in the exemplary embodiment, the image of the virtual space is able to be stored as an image which has been rotated by 90 degrees, and, for example, an image displayed as a laterally elongated image in a normal game play is able to be stored as a longitudinally elongated image. When the stored image is displayed on another device, the image is able to be displayed as a longitudinally elongated image.

In the exemplary embodiment, the progress of the game is temporarily stopped in the imaging mode, and, in that state, the virtual camera VC is able to be rotated in the pitch direction or the yaw direction or moved. Thus, an image of the virtual space which is viewed at a desired angle and a desired position can be taken, and various images during the game are able to be stored.

In the exemplary embodiment, by a filter being selected, a display manner for an image during the game is able to be changed and the image is able to be taken.

(Modification)

Although the exemplary embodiment has been described above, various modifications may be made in other embodiments.

For example, in the above-described exemplary embodiment, the virtual camera VC is rotated around the Zc-axis which is fixed with respect to the virtual camera VC. In another exemplary embodiment, the virtual camera VC may be rotated around an axis which is different from the Zc-axis and is an axis (for example, axis parallel to the Zc-axis, or axis which is not perfectly parallel to the Zc-axis and deviated by a predetermined angle relative to the Zc-axis) of the line-of-sight direction of the virtual camera VC. That is, the axis of the line-of-sight direction of the virtual camera VC may be perfectly identical to the Zc-axis, may be parallel to the Zc-axis, or may be deviated by a predetermined angle relative to the Zc-axis (another axis having a component in the Zc-axis direction). The virtual camera VC is rotated around the axis of the line-of-sight direction, and the rotation information may be set according to an amount of rotation around the axis of the line-of-sight direction.

In the above-described exemplary embodiment, the game program D200 is stored in an external storage medium mounted in the slot 23, and the imaging control program D201 is stored in the flash memory 84 that is previously provided in the main body apparatus 2. The processor 81 determines the rotation information of an image by executing the game program D200, and the processor 81 stores the image and the rotation information of the image in the flash memory 84 by executing the imaging control program D201. In another exemplary embodiment, the imaging control program D201 may be a part of the game program D200. That is, a program including the game program D200 and the imaging control program D201 may be stored in an external storage medium. Furthermore, a program including the game program D200 and the imaging control program D201 may be previously stored in the flash memory 84. Moreover, a program including the game program D200 and the imaging control program D201 may be downloaded from an external device.

In the above-described exemplary embodiment, the virtual camera VC is able to be rotated in the pitch direction and the yaw direction, according to an operation performed by a player, in the game mode. In another exemplary embodiment, rotation of the virtual camera VC in the pitch direction, in the yaw direction, and also in the roll direction may be prohibited in the game mode.

In the above-described exemplary embodiment, rotation of the virtual camera VC in the roll direction according to an operation performed by a player is not able to be performed in the game mode. In another exemplary embodiment, the virtual camera VC may be rotated in the roll direction (also in the pitch direction and the yaw direction) according to an operation performed by a player in the game mode. An image which is being displayed, and the rotation information, of the image, which is determined according to a rotation angle of the virtual camera VC in the roll direction may be stored in a storage medium, according to an operation on the record button 37, during the game play.

In the above-described exemplary embodiment, a game in which the player character 200 is operated, according to an operation performed by a player, in the game mode, is assumed. In another exemplary embodiment, not only a game in which the player character 200 is operated according to an operation performed by a player, but also a game in which an object automatically moves in the virtual space regardless of an operation performed by a player, may be played. While such a game is being played, the game mode may be switched to the imaging mode. In the imaging mode, the virtual camera is rotated in the roll direction according to an operation performed by a player, and, according to an instruction from the player, an image as viewed from the virtual camera at the time of the instruction, and the rotation information of the image may be stored in a storage medium.

In the above-described exemplary embodiment, a still image is stored in a storage medium according to an operation on the record button 37. In another exemplary embodiment, a moving image may be stored according to an operation performed by a player. For example, the virtual camera is rotated in the roll direction during a game play, and a moving image during the game, and the rotation information determined according to a rotation angle of the virtual camera in the roll direction may be stored in a storage medium according to an operation performed by the player.

In the above-described exemplary embodiment, an image displayed on the display 12 and the rotation information of the image are stored in the flash memory 84 according to an operation on the record button 37. The image and the rotation information of the image may be stored in any storage medium according to an operation on the record button 37. For example, an image and the rotation information of the image may be stored in an external storage medium mounted in the slot 23 or another slot according to an operation on the record button 37. For example, in a case where the game system 1 is connected to a network (for example, the Internet) by a wired or wireless connection, an image and the rotation information of the image may be stored in a storage medium over the network according to an operation on the record button 37.

In the above-described exemplary embodiment, an image of the virtual space is generated by using the virtual camera VC at predetermined time intervals (for example, at intervals of 1/60 seconds), the rotation information of the generated image is determined, and the image of the virtual space and the rotation information thereof are stored in the DRAM 85. At a time when an operation is performed on the record button 37, the image and the rotation information of the image, which are stored in the DRAM 85, are stored in another storage medium. That is, an image of the virtual space is constantly generated, and the rotation information of the image is determined and temporarily stored each time the image is generated, and the temporarily stored image and the rotation information of the image are stored in a storage medium according to an operation being performed on the record button 37. In another exemplary embodiment, an image of the virtual space may be generated by using the virtual camera VC at predetermined time intervals (for example, at intervals of 1/60 seconds) and, at a time when an operation is performed on the record button 37, the rotation information of an image generated at the time may be determined. That is, in another exemplary embodiment, at a time when an operation is performed on the record button 37, the rotation information of an image being displayed, is determined based on an orientation of the virtual camera at the time when the operation is performed on the record button 37, and the image which is being displayed and the rotation information may be stored in the storage medium.

Furthermore, in the above-described exemplary embodiment, any of the information representing "no rotation", the information representing "90 degrees rotation in the clockwise direction", and the information representing "90 degrees rotation in the counterclockwise direction" is stored as the rotation information of an image. In another exemplary embodiment, any of information representing "180 degrees rotation", information representing "90 degrees rotation, in the clockwise direction, followed by lateral inversion", information representing "90 degrees rotation, in the counterclockwise direction, followed by lateral inversion", information representing "no rotation and lateral inversion", and information representing "no rotation and vertical inversion", in addition to the information representing "no rotation", the information representing "90 degrees rotation in the clockwise direction", and the information representing "90 degrees rotation in the counterclockwise direction", may be stored, as the rotation information of an image, based on the orientation of the virtual camera.

Furthermore, the game system described above is merely an exemplary one. The game program and the imaging control program may be executed by any information processing apparatus or an information processing system in which a plurality of devices are combined with each other. For example, the information processing apparatus may be a smartphone, a tablet terminal, a personal computer, a stationary game apparatus, or the like. The information processing system may include a plurality of devices connected to a network (for example, the Internet). The information processing apparatus or the information processing system controls an orientation of the virtual camera according to an operation performed by a player. The information processing apparatus or the information processing system may store, in a storage medium, an image of the virtual space as viewed from the virtual camera, and the rotation information of the image, according to an operation performed by a player.

While the exemplary embodiment has been described above, the foregoing description is in all aspects illustrative, and numerous other modifications and variations may be devised.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game system comprising:
a storage medium; and
at least one processor and a memory coupled thereto, wherein the at least one processor is configured to at least:
control an object in a virtual space;
control an orientation of a virtual camera in the virtual space, based on an operation performed by a player;
generate an image of the virtual space based on the virtual camera, for display, at certain time intervals; and
store, according to an instruction from a player, an image generated at a time of the instruction, and rotation information, of the image, determined based on an orientation of the virtual camera at the time of the instruction, in the storage medium.

2. The game system according to claim 1, wherein the at least one processor is further configured to:
switch to an imaging mode, during a game play, based on an operation performed by a player, wherein in the imaging mode, an object in the virtual space is controlled so as not to update a state of the object, and the virtual camera is rotated at least around an axis of a line-of-sight direction, based on an operation performed by a player; and
determine the rotation information, based on an amount of rotation of the virtual camera around the axis of the line-of-sight direction at the time of the instruction.

3. The game system according to claim 2, wherein, in a case where the amount of rotation becomes greater than or equal to a threshold value, the at least one processor is further configured to determine, as the rotation information, information indicating that an image stored in the storage medium is rotated by 90 degrees and displayed when the image is displayed.

4. The game system according to claim 2, wherein the at least one processor is further configured to add an additional image to at least a part of an image generated, and rotate and add the additional image when an amount of rotation of the virtual camera becomes greater than or equal to a threshold value, in the imaging mode.

5. The game system according to claim 2, wherein the at least one processor is further configured to change a display manner for at least a part of an image generated, according to an instruction from a player, in the imaging mode.

6. The game system according to claim 5, wherein the at least one processor is further configured to subject at least a part of an image generated to at least one of deforming the image, blurring the image, changing a color tone of the image, changing a brightness of the image, changing a resolution of the image, and extracting a feature of the image.

7. The game system according to claim 2, wherein the at least one processor is further configured to generate an image so as not to display a portion, of the image, which is displayed during the game play, in the imaging mode.

8. The game system according to claim 1, further comprising:
a display having a laterally elongated or a longitudinally elongated screen; and
a hand-held housing configured to support the display;
wherein the at least one processor is further configured to display, on the display, an image generated.

9. The game system according to claim 8, further comprising an external output to output, to an outside, an image generated.

10. A non-transitory storage medium having stored therein a game program executable by a computer of an information processing system, the game program, when executed, causing the computer to at least:

control an object in a virtual space;
control an orientation of a virtual camera in the virtual space, based on an operation performed by a player;
generate an image of the virtual space based on the virtual camera, for display, at certain time intervals; and
determine, based on an orientation of the virtual camera, rotation information of an image, of the virtual space, which is generated in the image generation and stored in a storage medium, the rotation information being used when the image is stored in the storage medium.

11. The non-transitory storage medium having stored therein the game program according to claim 10, the game program, when executed, causing the computer to further switch to an imaging mode, during a game play, based on an operation performed by a player, wherein
when switching to the imaging mode has been performed, an object in the virtual space is controlled so as not to update a state of the object, in the object control,
the virtual camera is rotated at least around an axis of a line-of-sight direction, based on an operation performed by a player, in the virtual camera control, and
the rotation information is determined, in the rotation information determination, based on an amount of rotation of the virtual camera around the axis of the line-of-sight direction, the amount of rotation being obtained when the image is generated in the image generation.

12. The non-transitory storage medium having stored therein the game program according to claim 11, wherein, in the rotation information determination, in a case where the amount of rotation becomes greater than or equal to a threshold value, information indicating that the image is rotated by 90 degrees and displayed when the image is displayed, is determined as the rotation information.

13. The non-transitory storage medium having stored therein the game program according to claim 11, the game program causing the computer to further add an additional image to at least a part of an image generated in the image generation, and rotate and add the additional image when an amount of rotation of the virtual camera becomes greater than or equal to a threshold value, in the imaging mode.

14. The non-transitory storage medium having stored therein the game program according to claim 11, the game program, when executed, causing the computer to further change a display manner for at least a part of an image generated in the image generation, according to an instruction from a player, in the imaging mode.

15. The non-transitory storage medium having stored therein the game program according to claim 14, wherein, in the changing, at least a part of an image generated in the image generation is subjected to at least one of deforming the image, blurring the image, changing a color tone of the image, of changing a brightness of the image, of changing a resolution of the image, and of extracting a feature of the image.

16. The non-transitory storage medium having stored therein the game program according to claim 11, wherein, in the image generation, an image is generated so as not to display a portion, of the image, which is displayed during a game play, in the imaging mode.

17. A game apparatus comprising:
a storage medium; and
at least one processor and a memory coupled thereto, wherein the at least one processor is configured to at least:
control an object in a virtual space;
control an orientation of a virtual camera in the virtual space, based on an operation performed by a player;
generate an image of the virtual space based on the virtual camera, for display, at certain time intervals; and
store, according to an instruction from a player, an image generated by the image generation at a time of the instruction, and rotation information, of the image, determined based on an orientation of the virtual camera at the time of the instruction, in the storage medium.

18. The game apparatus according to claim 17, wherein the at least one processor is further configured to:
switch to an imaging mode, during a game play, based on an operation performed by a player, wherein in the imaging mode, an object in the virtual space is controlled so as not to update a state of the object, and the virtual camera is rotated at least around an axis of a line-of-sight direction, based on an operation performed by a player; and
determine the rotation information, based on an amount of rotation of the virtual camera around the axis of the line-of-sight direction at the time of the instruction.

19. A game processing method performed by an information processing system, the game processing method comprising:
controlling an object in a virtual space;
controlling an orientation of a virtual camera in the virtual space, based on an operation performed by a player;
generating an image of the virtual space based on the virtual camera, for display, at certain time intervals; and
storing, according to an instruction from a player, an image generated in the image generation at a time of the instruction, and rotation information, of the image, determined based on an orientation of the virtual camera at the time of the instruction, in a storage medium.

20. The game processing method according to claim 19, further comprising:
switching to an imaging mode, during a game play, based on an operation performed by a player, wherein in the imaging mode, an object in the virtual space is controlled so as not to update a state of the object, in the object control, and the virtual camera is rotated at least around an axis of a line-of-sight direction, based on an operation performed by a player, in the virtual camera control; and
determining the rotation information, based on an amount of rotation of the virtual camera around the axis of the line-of-sight direction at the time of the instruction.

* * * * *